US010953970B2

(12) United States Patent
Cattano

(10) Patent No.: US 10,953,970 B2
(45) Date of Patent: Mar. 23, 2021

(54) TRACTION AIR DEVICE, AIR DEVICE FOR A WIND PLANT AND WIND PLANT FOR ELECTRIC POWER PRODUCTION, SHIP PROVIDED WITH A TRACTION AIR DEVICE

(71) Applicant: SKYPULL SAGL, Lugano (CH)

(72) Inventor: Aldo Cattano, Porto Valtravaglia (IT)

(73) Assignee: SKYPULL SA, Dino (CH)

( * ) Notice: Subject to any disclaimer, the term of this patent is extended or adjusted under 35 U.S.C. 154(b) by 848 days.

(21) Appl. No.: 15/558,895

(22) PCT Filed: Mar. 17, 2016

(86) PCT No.: PCT/EP2016/000479
§ 371 (c)(1),
(2) Date: Sep. 15, 2017

(87) PCT Pub. No.: WO2016/150561
PCT Pub. Date: Sep. 29, 2016

(65) Prior Publication Data
US 2018/0065722 A1    Mar. 8, 2018

(30) Foreign Application Priority Data
Mar. 20, 2015    (IT) .......................... UD2015A000038

(51) Int. Cl.
*B63H 9/069*    (2020.01)
*B64C 3/16*    (2006.01)
(Continued)

(52) U.S. Cl.
CPC .............. *B63H 9/069* (2020.02); *B64C 3/16* (2013.01); *B64C 31/06* (2013.01); *B64C 39/022* (2013.01);
(Continued)

(58) Field of Classification Search
CPC ........ B63H 9/069; B63H 9/072; B64C 31/06; B64C 39/022; B64C 39/068; B64C 3/16; B64C 9/18; B64C 9/20; F03D 5/005; F03D 5/04; F03D 5/06; F05B 2250/12; F05B 2240/917; F05B 2240/921; F05B 2240/931; F05B 2240/94; F05B 2250/121; Y02E 10/70; Y02E 10/728; B63B 2035/446; Y02T 50/10; Y02T 50/30
See application file for complete search history.

(56) References Cited

U.S. PATENT DOCUMENTS 9,013,055 B1 *    4/2015    Phipps ...................... F03D 5/06
290/55
9,126,675 B2 *    9/2015    Chubb .................. B64C 39/022
(Continued)

FOREIGN PATENT DOCUMENTS

DE    102007057267 A1    11/2008
EP    2341242 A2    7/2011

OTHER PUBLICATIONS

International Search Report for corresponding International Application No. PCT/EP2016/000479.

*Primary Examiner* — Assres H Woldemaryam
(74) *Attorney, Agent, or Firm* — Underwood & Associates, LLC

(57) ABSTRACT

Traction air device with multiple wing contours for a wind power generation plant and wind power generation plant utilizing the air device.

20 Claims, 11 Drawing Sheets

(51) Int. Cl.
- *F03D 5/00* (2006.01)
- *F03D 5/04* (2006.01)
- *F03D 5/06* (2006.01)
- *B64C 31/06* (2020.01)
- *B64C 39/02* (2006.01)
- *B64C 39/06* (2006.01)
- *B64C 9/18* (2006.01)
- *B64C 9/20* (2006.01)
- *B63B 35/44* (2006.01)
- *B63H 9/072* (2020.01)

(52) U.S. Cl.
CPC ............ *B64C 39/068* (2013.01); *F03D 5/005* (2013.01); *F03D 5/04* (2013.01); *F03D 5/06* (2013.01); *B63B 2035/446* (2013.01); *B63H 9/072* (2020.02); *B64C 9/18* (2013.01); *B64C 9/20* (2013.01); *F05B 2240/917* (2013.01); *F05B 2240/921* (2013.01); *F05B 2240/931* (2013.01); *F05B 2240/94* (2013.01); *F05B 2250/12* (2013.01); *F05B 2250/121* (2013.01); *Y02E 10/70* (2013.01); *Y02E 10/728* (2013.01)

(56) References Cited

U.S. PATENT DOCUMENTS

| | | | |
|---|---|---|---|
| 9,187,165 B2* | 11/2015 | Vermillion | B64B 1/00 |
| 9,399,982 B2* | 7/2016 | Austin | F03D 3/02 |
| 9,771,925 B2* | 9/2017 | GilroySmith | F03D 80/70 |
| 10,167,842 B2* | 1/2019 | Dolerud | F03B 13/10 |
| 2002/0040948 A1* | 4/2002 | Ragner | F03D 13/20 |
| | | | 244/153 R |
| 2005/0046197 A1* | 3/2005 | Kingsley | F03D 5/00 |
| | | | 290/55 |
| 2007/0126241 A1* | 6/2007 | Olson | F03D 5/06 |
| | | | 290/55 |
| 2012/0104763 A1* | 5/2012 | Lind | B64C 31/06 |
| | | | 290/55 |

* cited by examiner

Fig. 23
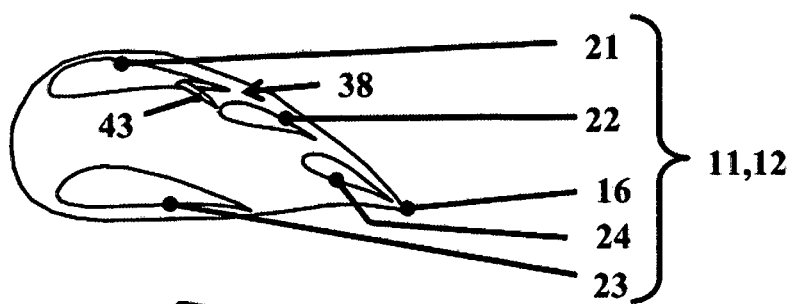
Fig. 24
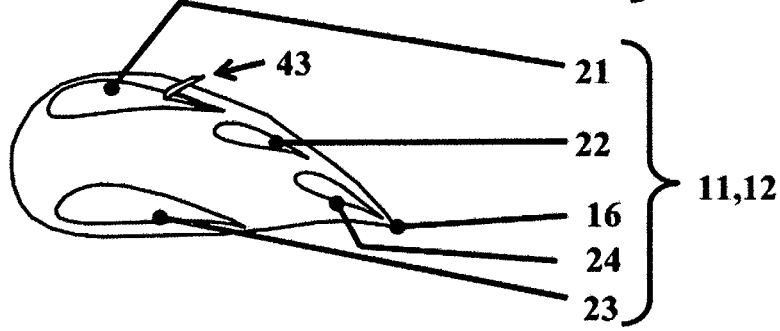
Fig. 25
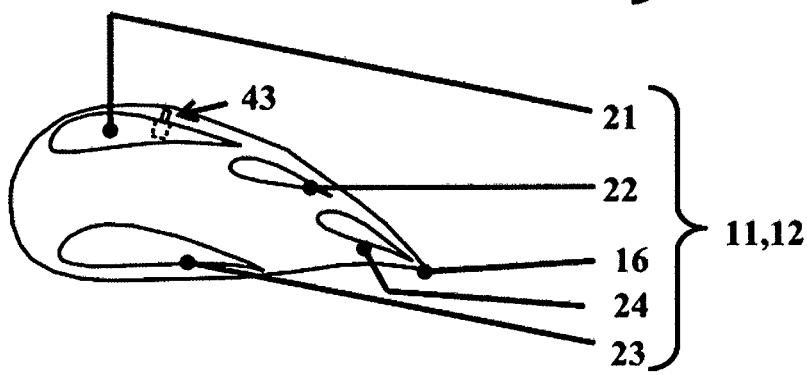
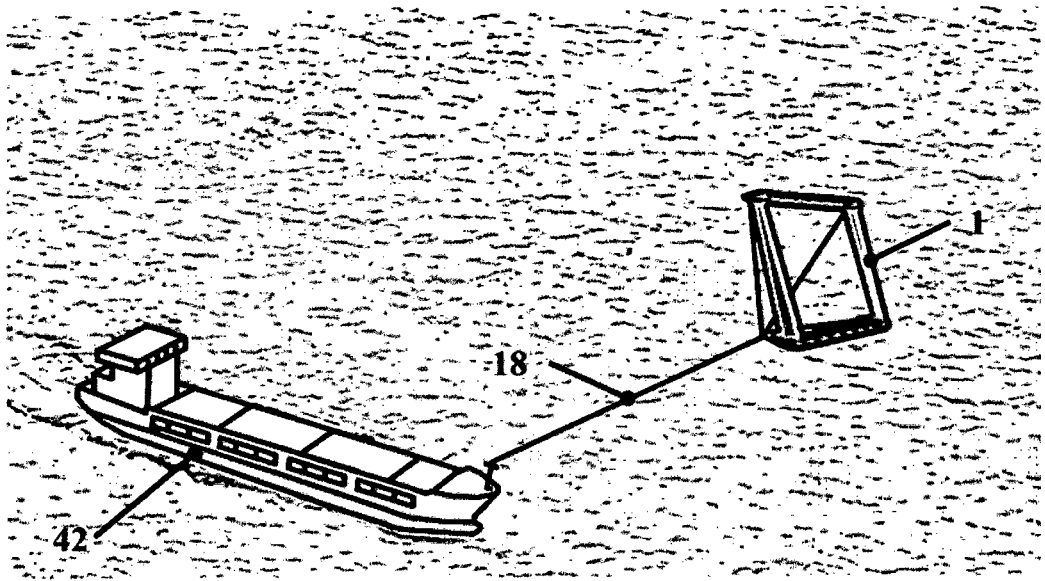
Fig. 26

TRACTION AIR DEVICE, AIR DEVICE FOR A WIND PLANT AND WIND PLANT FOR ELECTRIC POWER PRODUCTION, SHIP PROVIDED WITH A TRACTION AIR DEVICE

TECHNICAL FIELD

The present invention relates to a traction air device, an air device for a wind plant for electric power production and wind plant for electric power production comprising said device and a ship provided with a traction air device according to the appended claims.

PRIOR ART

In the field of electric power production it is well known to use wind turbines, which transform the kinetic energy of wind into mechanical energy, which is made available to the shaft of the turbine itself and in its turn is transformed into electric power by means of an electric generator. The electric power production plants by means of wind turbines mounted on towers are essentially subdivided, as well as on the basis of the overall generated power, into plants using turbines with a horizontal axis and plants using turbines with a vertical axis. Among the plants with a horizontal axis the possible configurations provide turbines with one, two or three blades, while those with a vertical axis, which are less widespread, generally provide blades arranged on mainly circular structures and supported by a base.

Solutions for the exploitation of high-altitude winds are known which are based on an air means provided with propellers and motors-generators in which the propellers are initially controlled by the motor-generator supplying electric power from the mains to take the air means to altitude and in which, afterwards, the propellers are used to produce electric power using the high-altitude winds. Therefore, the power is produced at a high altitude and is transmitted to the ground by means of an electric cable, which connects the air means to the ground. Solutions for the exploitation of high-altitude winds are known which are based on a hot air balloon, which is internally provided with a rotor and with a generator. In this case, too, the power is produced at altitude and is transmitted to the ground by means of an electric cable, which connects the hot air balloon to the ground.

Solutions for the exploitation of high-altitude winds are known which are based on an air means which is taken to a high altitude and which is connected to the ground by means of an anchoring cable which is alternately released and recovered to activate the generators placed on the ground.

Solutions for the exploitation of high-altitude winds are known which are based on a sail which is taken to a high altitude and which is connected to the ground by means of at least two control cables which are used to control the movements of the sail in a way similar to parachute canopies. In this case, too, an anchoring cable is necessary which is alternately released and recovered to activate the generators placed on the ground.

Solutions are known in which some sails are used to tow some trolleys, which are movable on rails placed on the ground along an annular path and in which the generation of power occurs by means of generators placed on the trolley.

Solutions are known in which a real aircraft is controlled by means of wireless control means in such a way as to fly at a high altitude and in which the generation of power occurs on the ground by means of a cable of connection to the aircraft which is alternately left free to follow the currents by pulling out the cable of connection and then recovered by pulling in the cable itself.

Solutions are known in which an air device is used for the traction of ships in which one or more air devices exploit the energy of wind to provide a traction energy for the advancement of a ship.

Patent application US 2012/104763 describes a system based on an air device adapted to operate in an alternate mode in high winds. The system may operate at reduced efficiency in high winds in order to moderate loading on the system during those high winds. The system may use multi-element airfoils, which are actuated to reduce the coefficient of lift of the airfoils in order to moderate loading in high wind conditions. Other flight aspects may be controlled, including flying the air device in side slip to induce drag which may lower loading on the system.

Patent application EP 1 629 193 describes an electrical power generation assembly which comprises a main body having a low density to provide lift and wind driven means on a surface of the main body to generate electrical power. The main body has an aerodynamic prismatic shape and has a part-circular, or a part-elliptical, cross-section frontal region. Patent application EP 2 341 242 describes a system destined to harness wind resources.

The system can transfer either wind's momentum into aerodynamic force that can be used directly in case the system is working as a high altitude platform or wind power to the ground station group on the surface, the process being performed through the tensioning and unwinding of the cable group connecting the airborne group to a reeler in the ground station group. Through the control group the resultant force vector of the aerodynamic forces tensioning the cable can be significantly altered.

Patent application US 2002/040948 describes a wind harnessing system using a plurality of self supporting airfoil kites for useful power. The system comprises multiple airfoil kites in tandem attached to a pivotal control housing by control lines and support lines. Control lines can change length with respect to the length of support lines to control the airfoil kites' angle-of-attack, pitch angle, direction of flight, and flight speed. The length of control lines are controlled from ground station by a movable pulley system in control housing to adjust the airfoils' direction to follow a specific flight path. Control lines and support lines are also wound on a power shaft and pulley system in control housing. As the airfoil kites are propelled by the wind at very-high speed, the airfoils generate a powerful axial force. The control lines and support lines are then reeled-out under this axial tension causing the power shaft and pulley system in control housing to turn a generator to generate electricity. After airfoil kites have finished their reel-out power stroke, the airfoil's pitch angle is greatly increased so they can be reeled-in by their control and support lines using a minimum of force along the path. Once the airfoils have been rewound to the proper distance, the airfoils are again angled for high-speed operation to generate powerful axial force and reeled-out to provide another power stroke The airfoil kites are then reeled-in again along the path and the entire process repeats. Since the force to rewind the airfoils is much less than the force generated during reel-out, there is net power generated.

Patent application US 2007/126241 describes a wind driven apparatus for an aerial power generation system which comprises driven elements and controls. The driven elements are configured and shaped to provide maximum force from both lift and drag during the downwind phase of operation and minimum force during the upwind phase. The driven elements have a sail portion with a leading edge and a trailing edge. The controls change the driven elements between high force configurations for downwind operation and low force configurations for upwind operation, adjust the pitch and azimuth angles of the driven elements, and control the camber.

Patent application DE 10 2007 057267 describes an arrangement for converting the drive force produced by the wind energy and the resultant relative motion of a float body relative to the surrounding water. The arrangement is provided with an energy ship with at least one free-flow water turbine or diffuser or vortex flow turbines driven by at least one wind, towed or tethered sail and/or by at least one Flettner rotor.

PROBLEMS OF THE PRIOR ART

The main disadvantages of the prior art solutions based on turbines equipped with wind blades are high costs, the need for low-altitude winds with a sufficient speed to set the turbine in motion, the intermittent operation due to the need for high minimum wind speeds, the need to install the turbine in a position very far from the ground, in general on a high tower, however not higher than a hundred metres, the need for a structure orientable on the basis of the wind direction, the need for maintenance, which has to be carried out on the top of the tower, where the blades and the generator are located. Furthermore, the dimensions and the sizes of the traditional wind generators have considerably increased both to exploit economy of scale factors and to try to capture winds with increasingly higher average speeds and with more constant behaviours. However, there are physical and engineering limits to the simple increase of the blades sizes or of the height of the towers due to the resistance of the materials and to the forces to which the structures are subjected. By overcoming certain limits of size of the blades and height of the towers, the risks of breaking increase and thus it is not advantageous—as well as being dangerous—to overcome such limits which do not allow for an effective exploitation of the currents and of the winds that can be found at higher altitudes. Moreover, although the increase in the sizes of the wind blades is translated into an efficiency increase, there are technological limits as well as limits concerning execution cost and obtainable efficiency.

The solutions based on air means or hot air balloons provided with generators which are taken to a high altitude require a strict automatic control of flight, also with the aid of gyroscopes and GPS systems because the structures at a high altitude must be controlled in way similar to an airplane or to a helicopter. Moreover, such systems are characterised by significant weight and sizes to be able to obtain suitable powers. Furthermore, such systems require large structures of anchorage to the ground to prevent damage in case of bad weather. Since power production occurs at a high altitude, such systems require a mooring and electrical connection cable having great sizes, length and weight because it is necessary to transport the power produced at a high altitude to the ground by means of a very long electrical cable. Such solutions, moreover, also have electric shock hazards because of the presence of the conductor cable, which connects the flying structure to the ground. Furthermore, such solutions also have the risk of interfering with the air traffic at a high altitude. Since the blades and the generator are placed on the air means, which is at a high altitude, there are also dangers of damage to things or people due to the possible fall of the air means itself which is very heavy and in case of loss of control may crash to the ground.

In the prior art solutions which are based on an air means or a sail with a double anchoring cable also having a control function of the air means the double anchoring cable is connected to generators placed on the ground. Since such solutions exploit the motion of release and recovery of the cable to activate the generators, they do not fully exploit the potentials of high-altitude winds and need two reel-generator units, thus increasing their costs. Furthermore, not only the generation of power is not constant in time but during the phase of recovery of the cable the system must supply power thus reducing the efficiency of the system or of the plant. Furthermore, the cable wears out rapidly because it is subject to continuous phases of unwinding up to the maximum tension and rewinding up to the minimum tension, therefore there is continuous rubbing between the turns of the wound-up cable. Moreover, due to the early wear of the cable, it is also necessary to provide maintenance and replacement interventions, consequently stopping the plant.

The prior art solutions which are based on an aircraft which is controlled by wireless control means are very complex because they require control systems, actuation systems, batteries and transmission means on the aircraft which systems must be sized in such a way as to ensure a control of a real aircraft and, therefore, they must be sufficiently robust and sized to be able to manoeuver the aircraft also during landing and in the absence of power generation. Furthermore, such systems are limited by the fact that they exploit the motion of release and recovery of the cable to activate the corresponding generator and they do not fully exploit the potentials of high-altitude winds, thus decreasing their efficiency and effectiveness. Moreover, not only the generation of energy is not constant in time but during the phase of recovery of the cable the system must supply power thus reducing the efficiency of the system or of the plant. Furthermore, the cable rapidly wears out because it is subject to continuous phases of unwinding up to the maximum tension and rewinding up to the minimum tension, therefore there is continuous rubbing between the turns of the wound-up cable. Moreover, due to the early wear of the cable, it is also necessary to provide maintenance and replacement interventions, consequently stopping the plant.

In general, the solutions based on rigid aircraft are exposed to risks of damage in case of fall of the aircraft, while the solutions based on sails are less efficient and do not allow to reach the same performances as the aircraft with rigid wings.

The solutions based on trolleys towed along an annular path, although solving some of the previously explained problems, are subject to significant problems due to the type of air means, which is used to tow the trolley. In fact, the air means is a sail. The presence of a non-rigid sail and the presence, in general, of various cables imply the risk of twisting of the cables with each other, with the consequent need to stop the plant. Furthermore, complex procedures are necessary for the take-off of the sails, which need to obtain a condition of sufficient inflation to be able to obtain the necessary flying speed in order to reach the operating altitude. This is very problematic if one considers that the sail must be periodically made to land and then take off again if there are not the optimum flight conditions or if it is necessary to carry out inspection or maintenance interventions.

The prior art solutions in which an air device is used for the traction of ships are little efficient and of difficult management.

Aim of the Invention

The aim of the present invention is to provide a traction air means which can be used both for the traction of a ship and for generating power in a wind plant for electric power production. A further aim of the present invention is to provide a traction air means, which is provided with an aerodynamic structure geometry so as to maximize aerodynamic efficiency and traction. A further aim of the present invention is to provide a traction air means which is also very light while keeping resistance and strength characteristics high.

A further aim of the present invention is to provide a traction air means, which does not require control systems, which are costly from the energy point of view to be kept in flight.

Concept of the Invention

The aim is achieved by the characteristics of the main claim. The sub-claims represent advantageous solutions.

Advantageous Effects of the Invention

The solution according to the invention advantageously allows for an efficient exploitation of high-altitude winds, both as to the application as a ship traction means and as to the application in a power generation plant. Furthermore, the solution according to the invention has low costs and requires less maintenance with respect to the traditional solutions, maintenance also being facilitated, with regard to both the application as a ship traction means and the application in a wind power generation plant.

The solution according to the present invention allows to obtain a wind generation plant with small overall dimensions and with a light structure.

The solution according to the invention advantageously allows to obtain almost double flight operating times with respect to the prior art systems and allows to use the wind coming from all directions without the need for orientable structures, both with regard to the application as a ship traction means and with regard to the application in a wind power generation plant.

As to the application as a ship traction means, the solution according to the invention allows to use wind power for ship traction thus reducing fuel consumption and polluting emissions.

DESCRIPTION OF THE DRAWINGS

In the following a solution is described with reference to the enclosed drawings, which are to be considered as non-exhaustive example of the present invention in which:

FIG. 23 shows a first possible embodiment of a guide system.

FIG. 24 shows a second possible embodiment of a guide system.

FIG. 25 shows a third possible embodiment of a guide system.

FIG. 26 shows the application of the device according to the invention for the traction of a ship.

DESCRIPTION OF THE INVENTION

Figure 1:
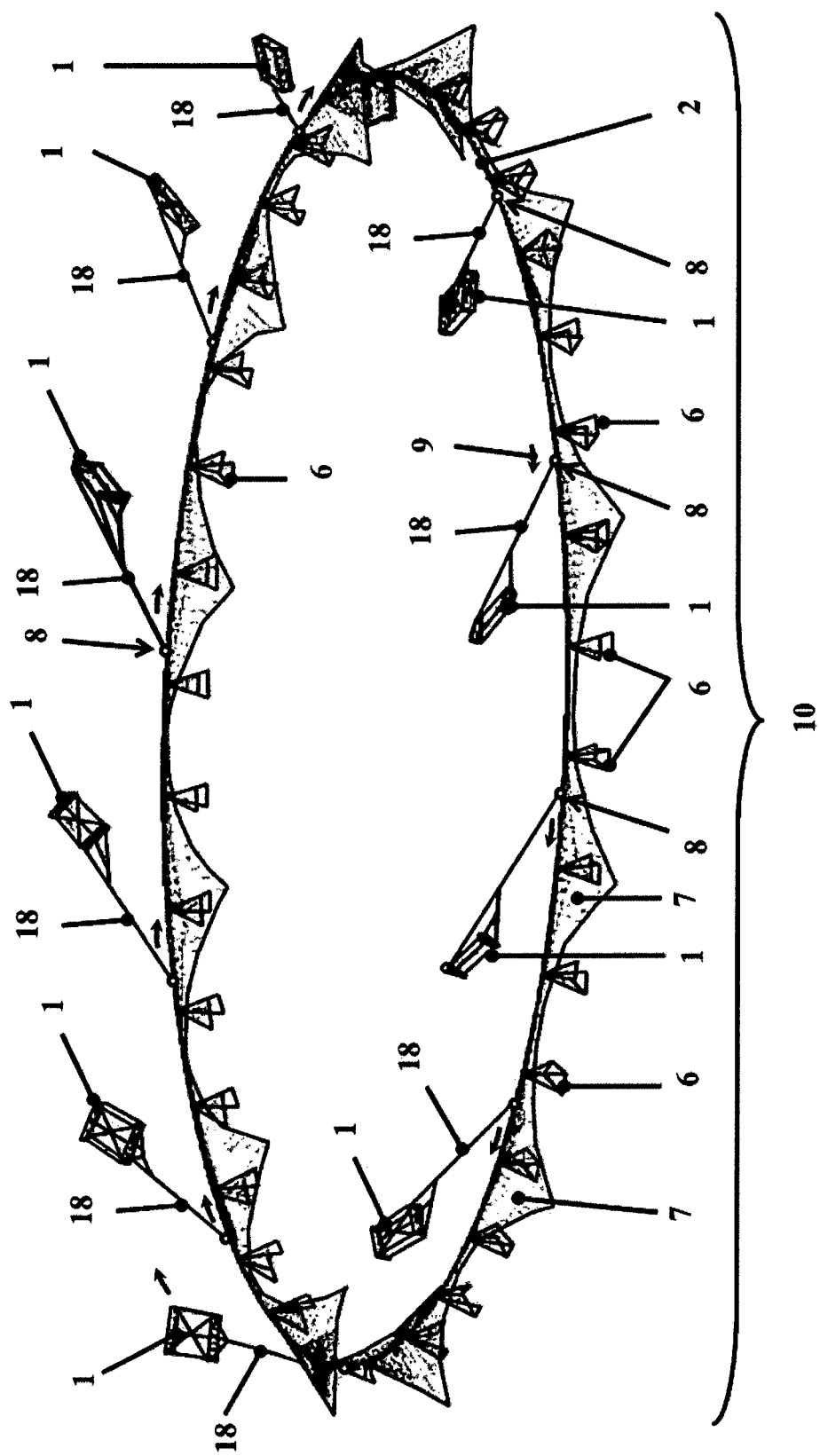
FIG. 1 shows a plant comprising the air device according to the invention.
Figure 2:
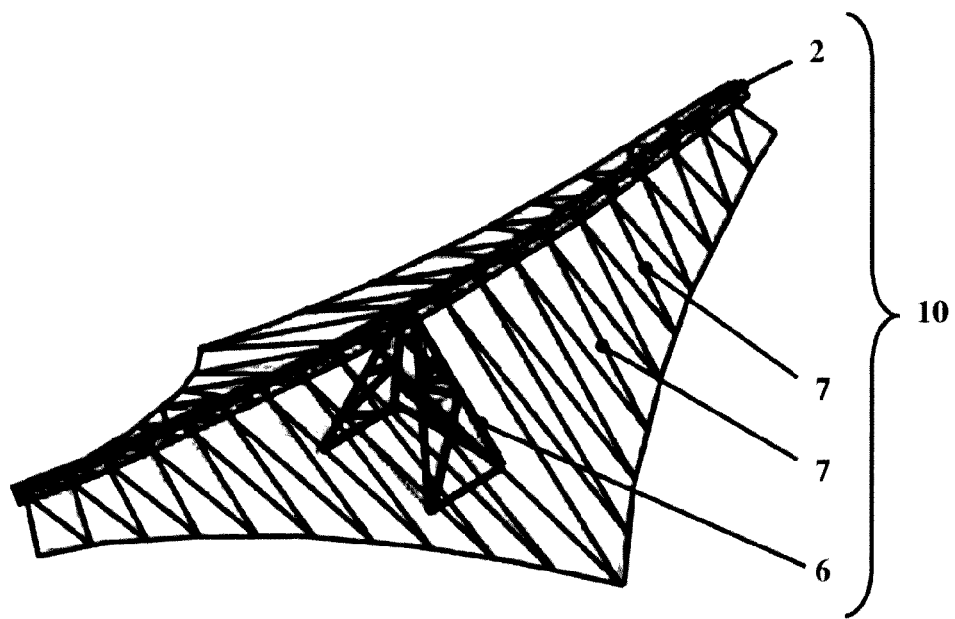
FIG. 2 shows a detail of the plant of FIG. 1.
Figure 3:
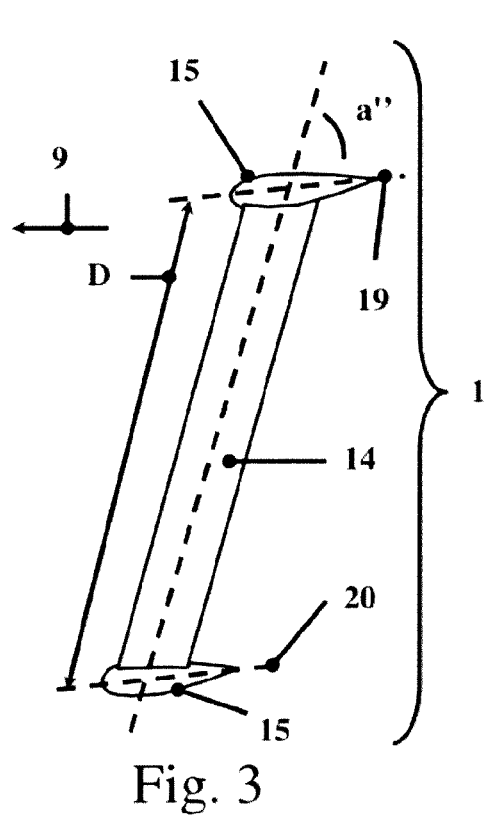
FIG. 3 shows a side view of the air device according to the invention.
Figure 4:
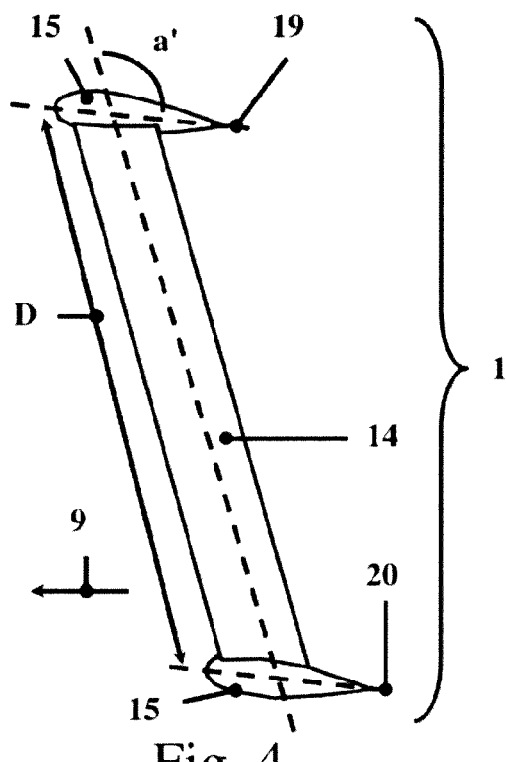
FIG. 4 shows a side view of a different embodiment of the air device.
Figure 5:
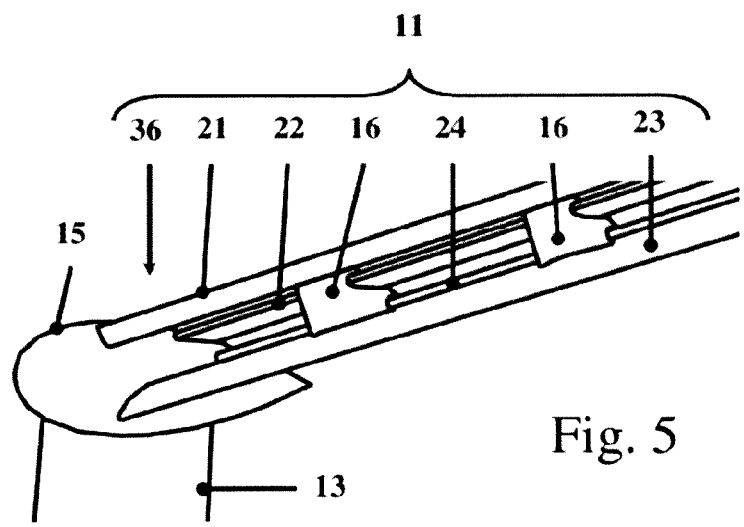
FIG. 5 shows a perspective view of a portion of the air device of FIG. 3.
Figure 6:
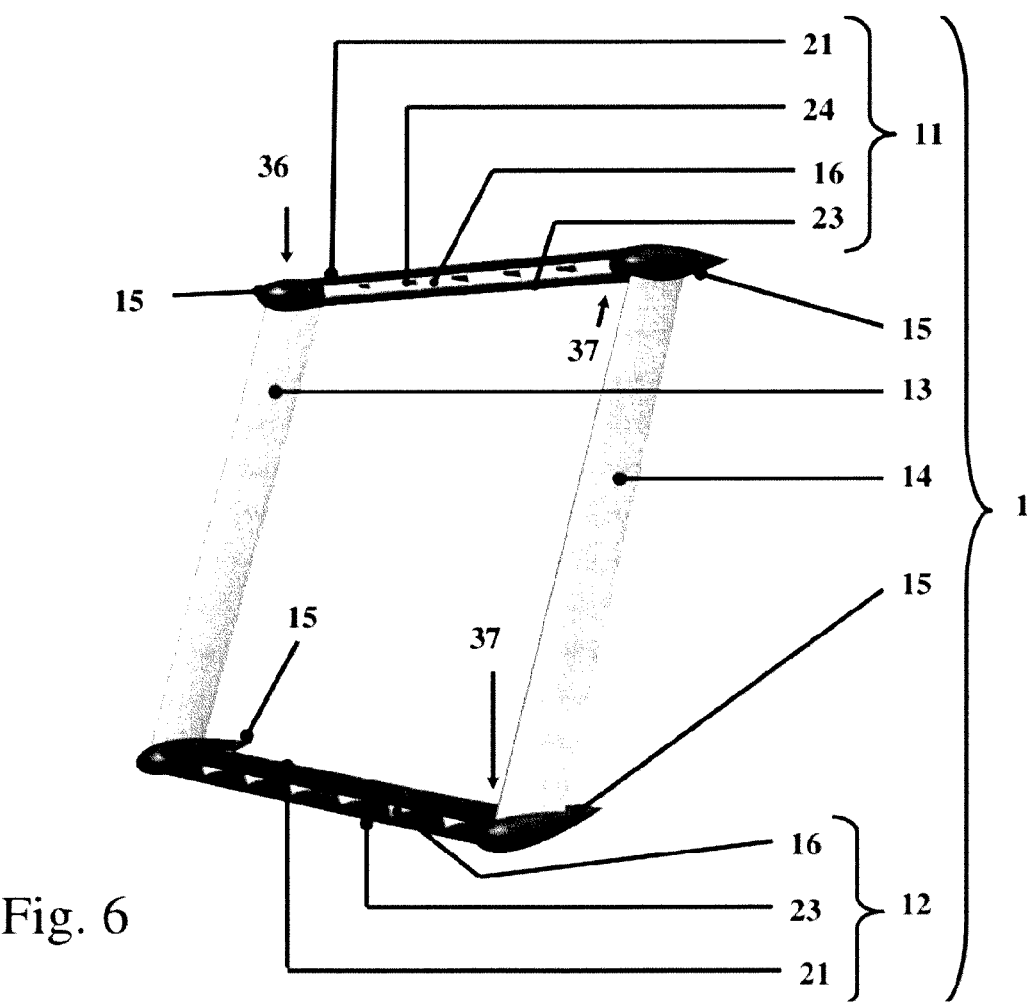
FIG. 6 shows a perspective view of the air device of FIG. 3.
Figure 7:
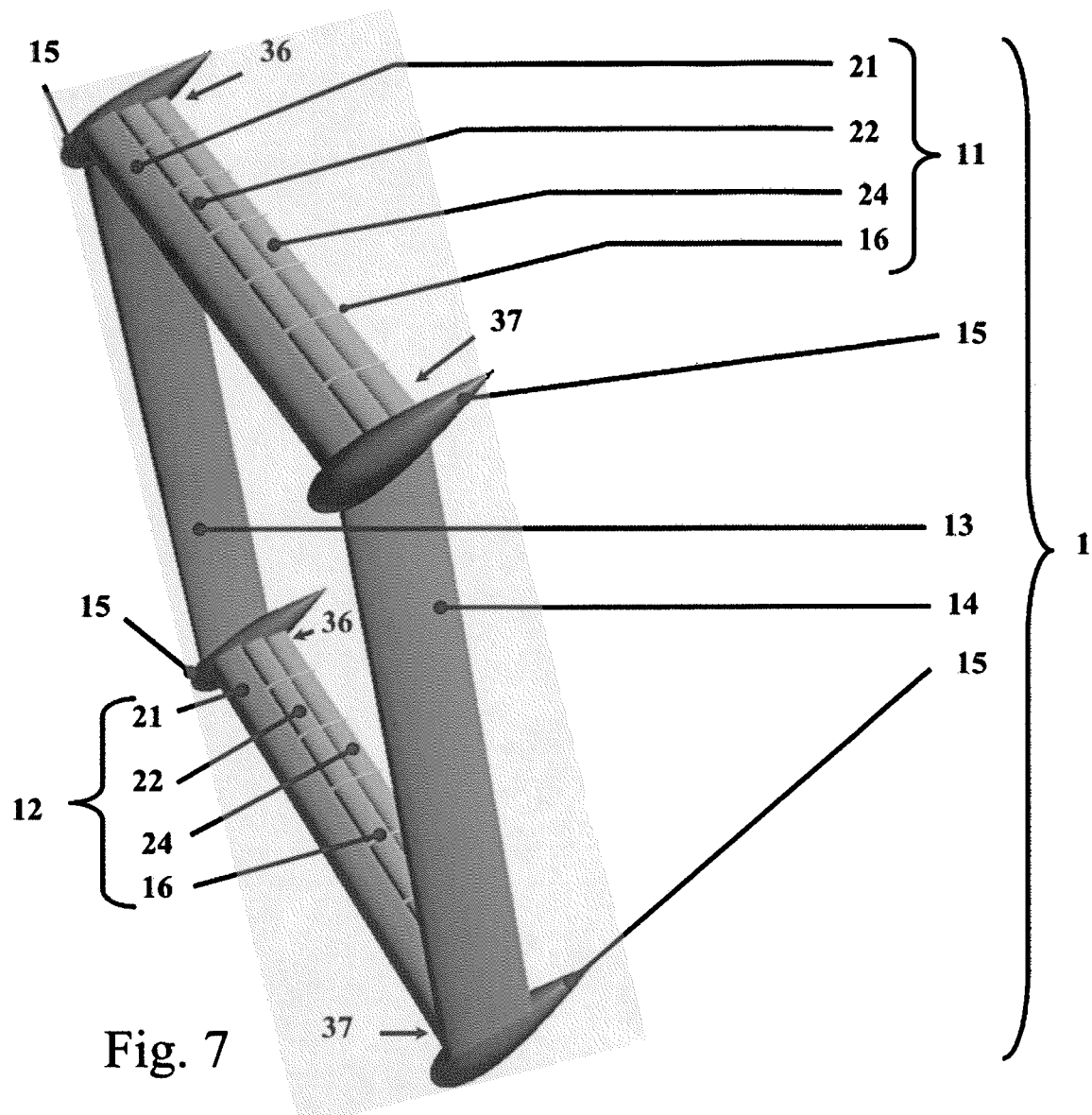
FIG. 7 shows a perspective view of the air device of FIG. 3.
Figure 12:
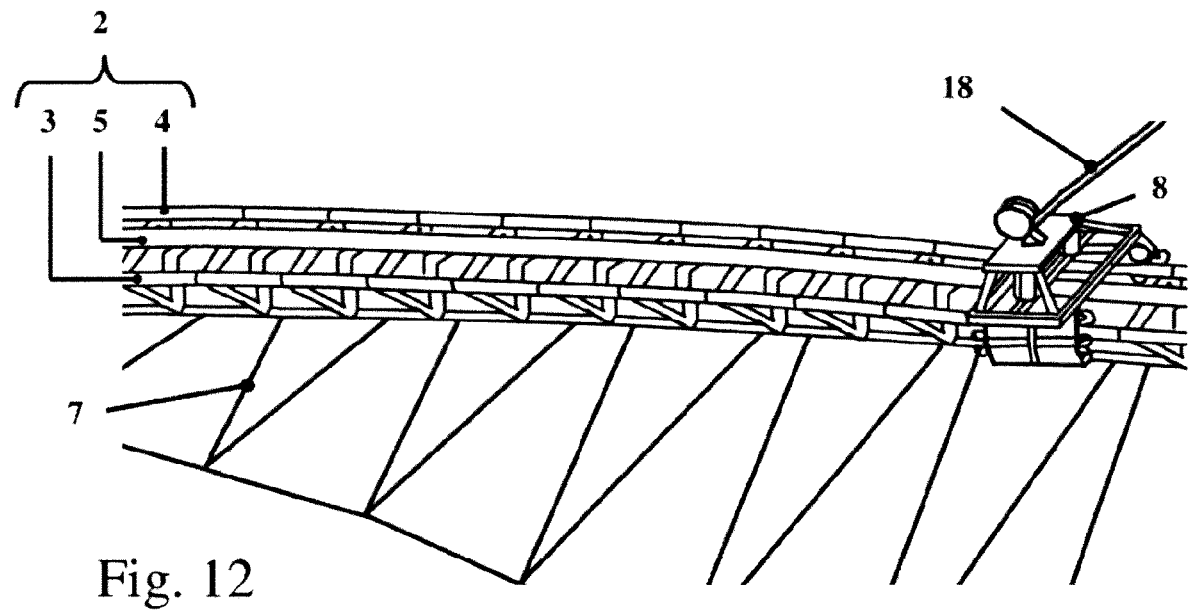
FIG. 12 shows a detail of the plant of FIG. 1.
Figure 13:
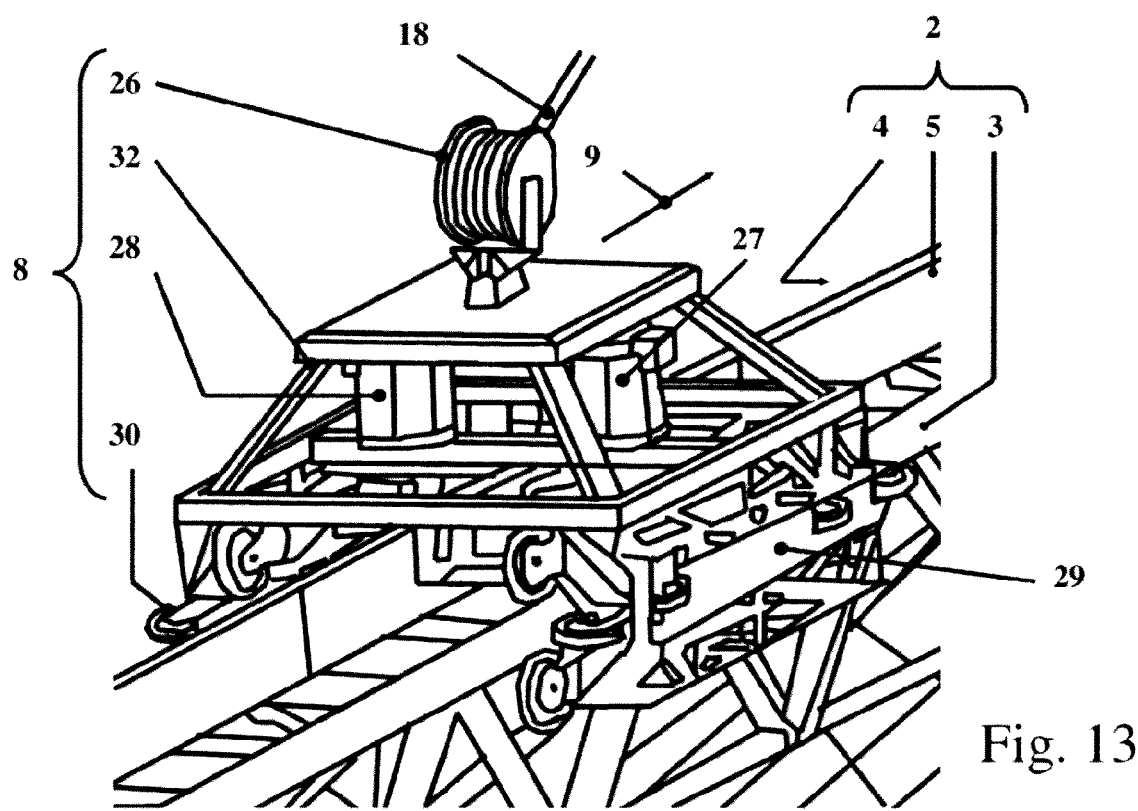
FIG. 13 shows a detail of the plant of FIG. 1.
Figure 14:
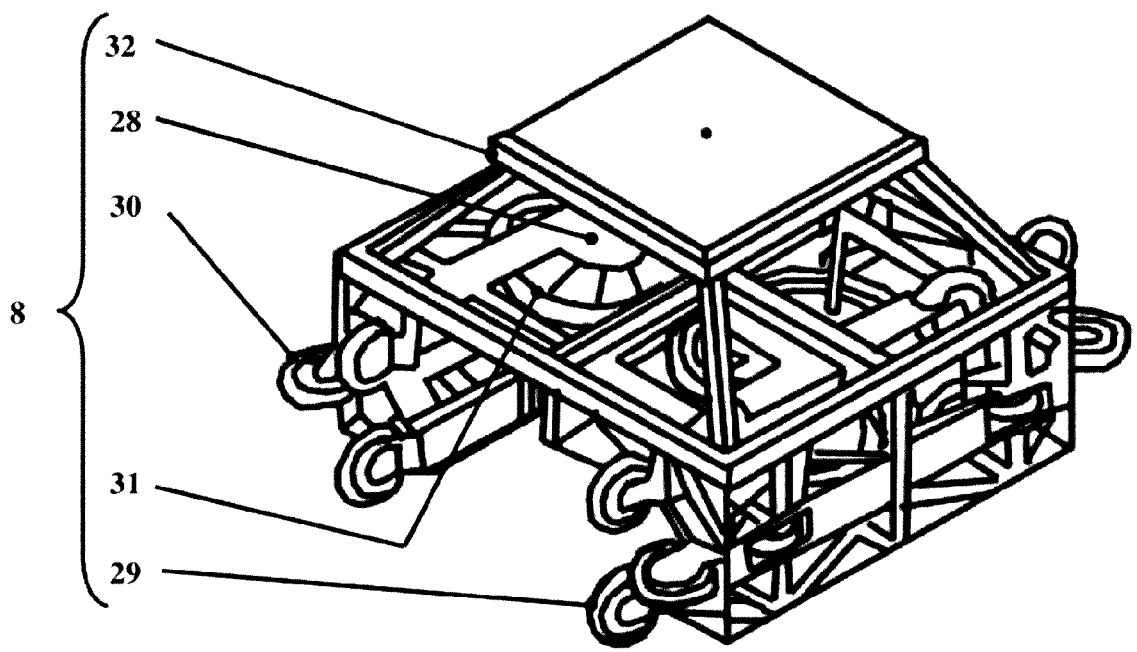
FIG. 14 shows a perspective view of a trolley of the plant of FIG. 1.
Figure 17:
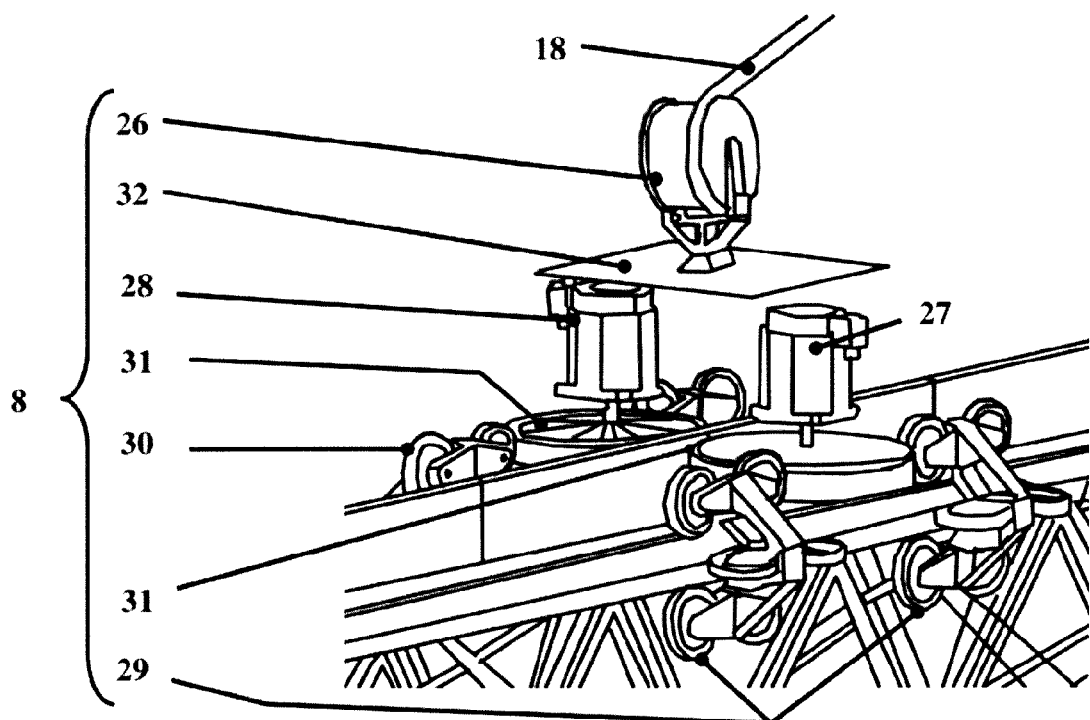
FIG. 17 shows a view of the trolley of FIG. 14 with some components removed.
Figure 19:
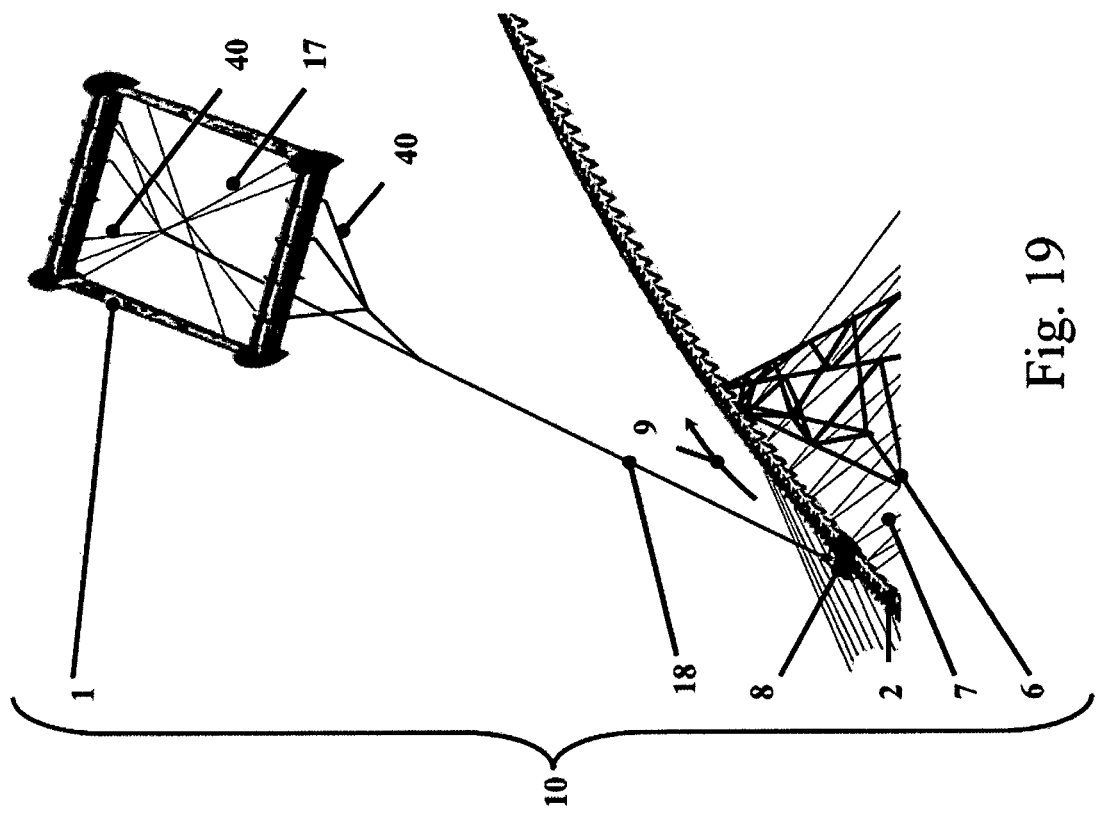
FIG. 19 shows a detail of the plant of FIG. 1.
Figure 20:
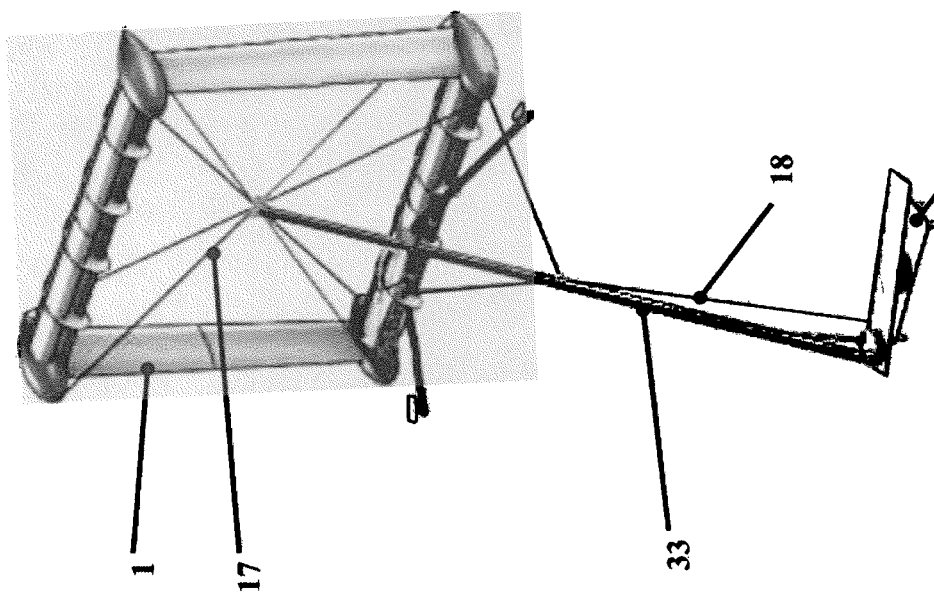
FIG. 20 shows a possible take-off and landing system.
Figure 21:
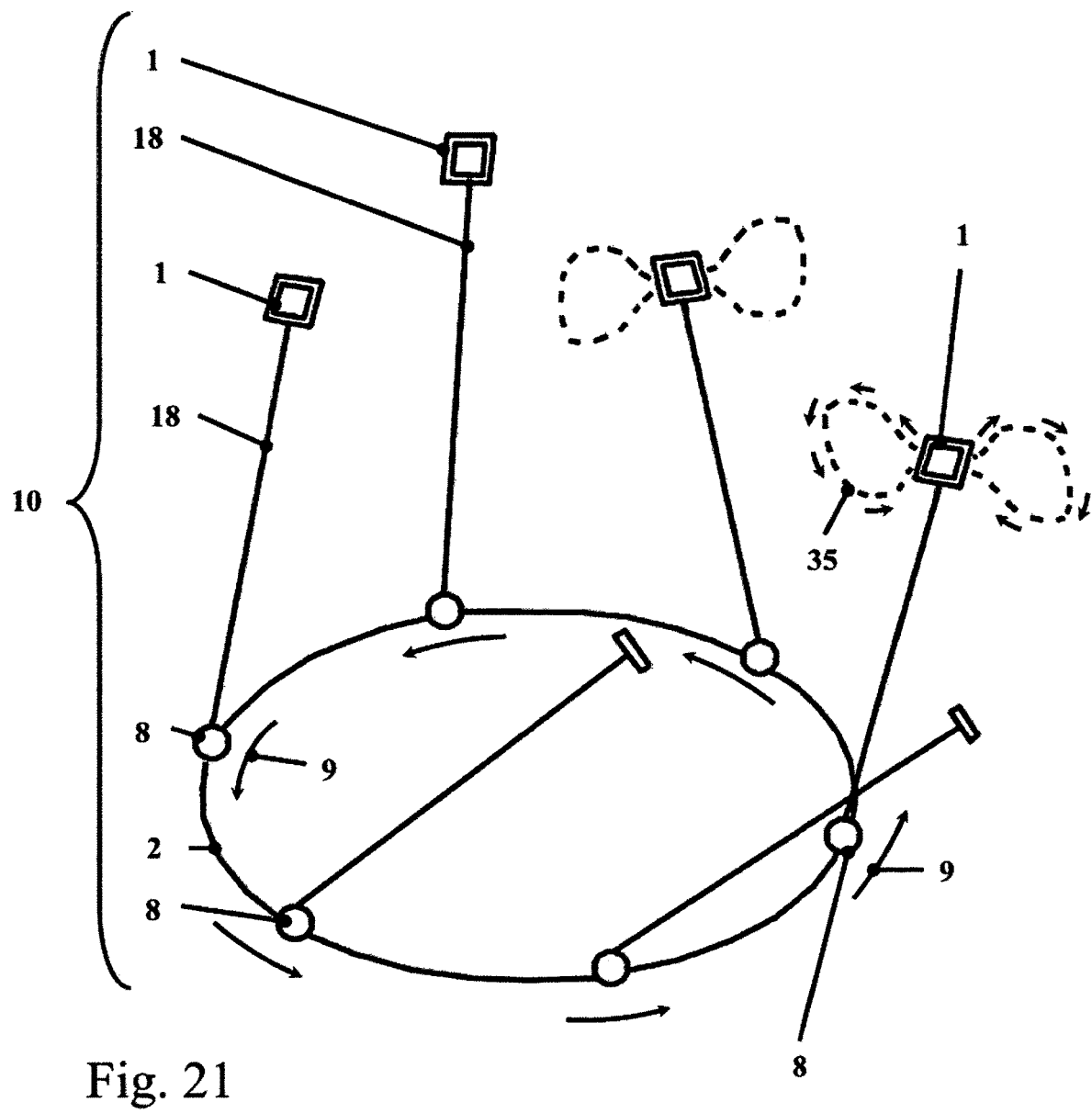
FIG. 21 schematically shows the operation of the plant of FIG. 1.
Figure 22:
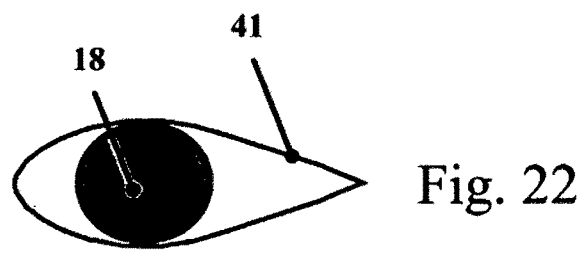
FIG. 22 shows the application of a coating to the retaining cable.

With reference to the figures, the present invention relates (FIG. 3, FIG. 4, FIG. 5, FIG. 6, FIG. 7) to an air device (1) for a wind plant and to a wind plant (10) for electric power production (FIG. 1, FIG. 2, FIG. 12, FIG. 13, FIG. 14, FIG. 19, FIG. 21). The air device (1) is connected (FIG. 1, FIG. 12, FIG. 13, FIG. 17, FIG. 19, FIG. 20, FIG. 21) by means of a retaining cable (18) to a trolley (8) which is sliding on a guide (2), the trolley being therefore towable by means of the air device (1) and being provided with means for generating electric power (27, 28). The solution according to the invention is applicable, in general, to ring-shaped path wind plants (10) in which the air device (1) is based on a cable system, which takes the air device (1) to a high altitude, where there is a great airflow both in terms of intensity and in terms of availability in time. In fact, from studies carried out in the field of wind power production, it results that wind speed and uniformity grow as altitude increases. For example, at a height of 100 m from the ground the average values of wind have poorly exploitable characteristics either due to the poor intensity or due to the poor constancy, while at 400 m of height from the ground the wind speed is always exploitable for power production and has characteristics of greater constancy in time. Since the power of the wind is proportional to the triple power of speed, the efficiency of a plant which exploits an air device (1) at a high altitude has better performances with respect to low-altitude plants with wind blades, obtaining a greater efficiency with an equal surface occupied on the ground. In fact, by comparing various types of plants one obtains that a plant with wind blades placed in the hinterland has an average production capacity of 700 W/square metre, a plant with wind blades placed on the coast has average production capacity of 1000 W/square metre, while the system according to the invention is able to obtain production capacities higher than 1800 W/square metre.

Figure 11:
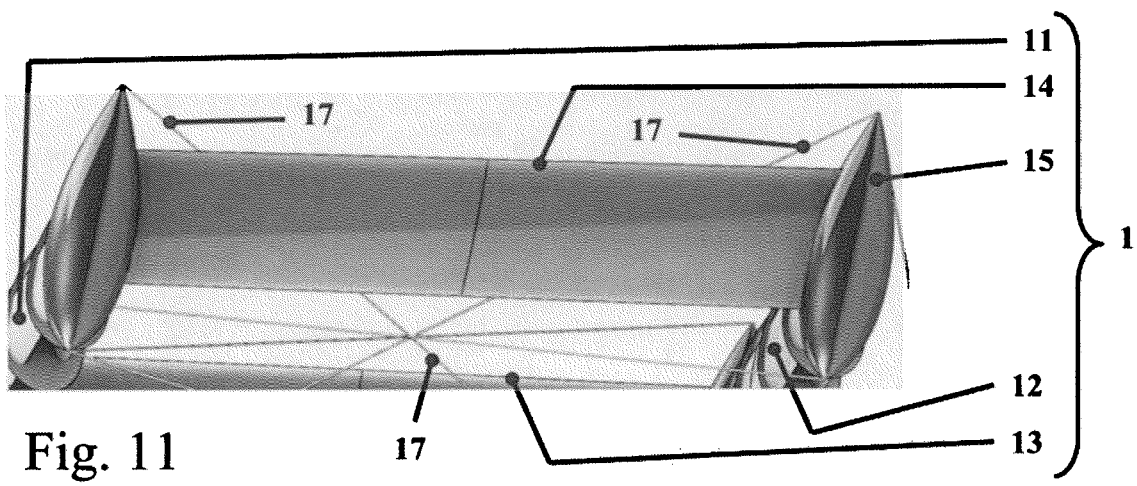
FIG. 11 shows a perspective view of the air device of FIG. 3.

The air device according to the invention (1) is provided (FIG. 3, FIG. 4, FIG. 5, FIG. 6, FIG. 7, FIG. 11) with two wings (11, 12) arranged according to a reciprocally superimposed configuration in which a first wing (11) is connected to a second wing (12) by means of connection elements (13, 14) which keep the two wings (11, 12) spaced from each other by a distance (D), which is preferably equal to a value such that the ratio between the width of the air device (1) and the distance (D) between the two wings (11, 12) is between 0.8 and 1.2. A first connection element (13) connects the first wing (11) to the second wing (12) near a first end (36) of the longitudinal development of the wings (11, 12). A second connection element (14) connects the first wing (11) to the second wing (12) near a second end (37) of the longitudinal development of the wings (11, 12). The first end (36) and the second end (37) are opposite ends of the longitudinal development of the wings (11, 12). The first wing (11) defines (FIG. 3, FIG. 4) a first wing contour (19) which represents the transverse development axis of the first wing (11). The second wing (12) defines (FIG. 3, FIG. 4) a second wing contour (20) which represents the transverse development axis of the second wing (12). The connection elements (13, 14) are connected to the wings (11, 12) according to a configuration such that the first wing (11), the second wing (12), the first connection element (13) and the second connection element (14) form an essentially quadrangular structure with double superimposed wings. With such a geometry with double superimposed wings one significantly minimizes the overall lateral dimensions with respect to the known prior art solutions because with an equal side extension of the air device (1) one obtains a double wing surface thanks to the presence of the first wing (11) and second wing (12) which are spaced from each other according to a reciprocally superimposed configuration. Reciprocally, with an equal wing surface one obtains halved overall lateral dimensions with respect to the prior art solutions. Such a configuration allows to obtain a minimum induced drag with equal surface and wiring aspect ratio. From the aerodynamic point of view it is equivalent to a single wing with doubled wing span. By halving the overall lateral dimensions with an equal wing surface one also improves the manoeuvrability of the air device (1) as well as its rigidity. The first wing (11) is configured to be placed above the second wing (12) in a flight condition of the air device (1). Preferably the first wing (11) is not vertically aligned with respect to the second wing (12) and the connection elements (13, 14) are connected to the wings (11, 12) according to a configuration such that the longitudinal development axis of the connection elements (13, 14) forms an angle (a', a") with respect to the wing contours (19, 20) of the wings (11, 12). One can provide two different configurations in which the connection elements (13, 14) will be connected to the wings (11, 12):

according to a configuration such that the first wing (11) is placed forward (FIG. 4) with respect to the second wing (12) and with respect to the advancement direction (9) in such a way as to create a certain longitudinal depth that allows to obtain greater longitudinal stability of the air device (1) when it is flying. In this case, therefore, the connection elements (13, 14) are connected to the wings (11, 12) according to a configuration such that the longitudinal development axis of the connection elements (13, 14) forms a first angle (a') with respect to the wing contours (19, 20) of the wings (11, 12), said first angle (a') being greater than ninety degrees, preferably between 91 and 135 degrees, even more preferably between 95 and 130 degrees;

according to a configuration such that the first wing (11) is placed rearward (FIG. 3) with respect to the second wing (12) and with respect to the advancement direction (9) in such a way as to create a certain longitudinal depth that allows to obtain greater longitudinal stability of the air device (1) when it is flying. In this case, therefore, the connection elements (13, 14) are connected to the wings (11, 12) according to a configuration such that the longitudinal development axis of the connection elements (13, 14) forms a second angle (a") with respect to the wing contours (19, 20) of the wings (11, 12), said second angle (a") being smaller than ninety degrees, preferably between 45 and 89 degrees, even more preferably between 50 and 85 degrees.

Such configurations are particularly important in the case in which the retaining cable (18) breaks. In fact, the described configuration of the air device (1) allows to obtain good stability conditions and, therefore, if the retaining cable (18) breaks, the air device (1) is able to land autonomously by gliding within a defined area.

However, it will be clear that solutions are also possible in which the first wing (11) is vertically aligned with respect to the second wing (12) and the connection elements (13, 14) will therefore be connected to the wings (11, 12) according to a configuration such that the longitudinal development axis of the connection elements (13, 14) forms an angle (a', a") of ninety degrees with respect to the wing contours (19, 20) of the wings (11, 12). Such a solution advantageously has better aerodynamic efficiency with respect to the solutions with vertically misaligned wings but one has less longitudinal control stability in case of passive flight.

Figure 8:
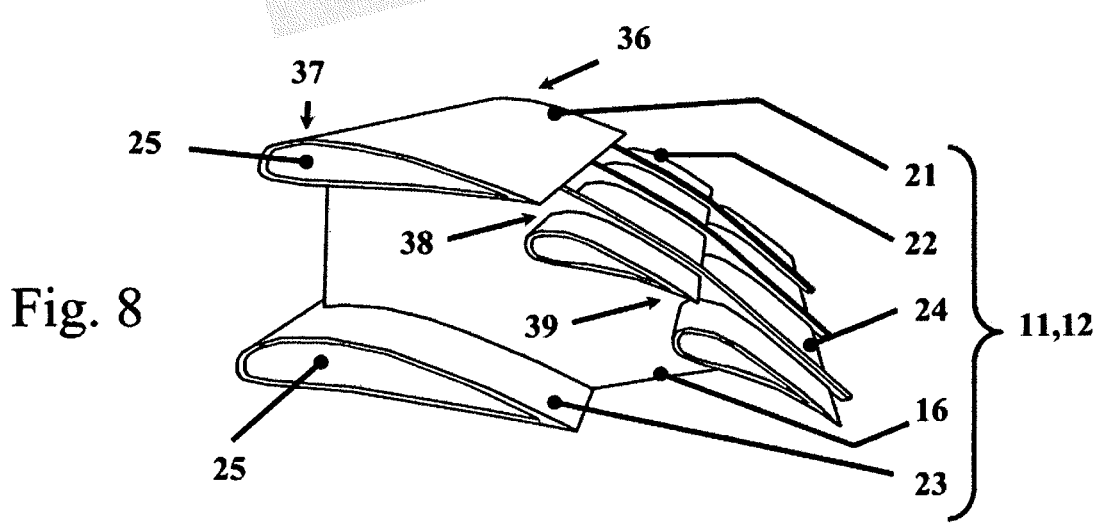
FIG. 8 shows a sectional view of one of the wings of the air device of FIG. 3.
Figure 9:
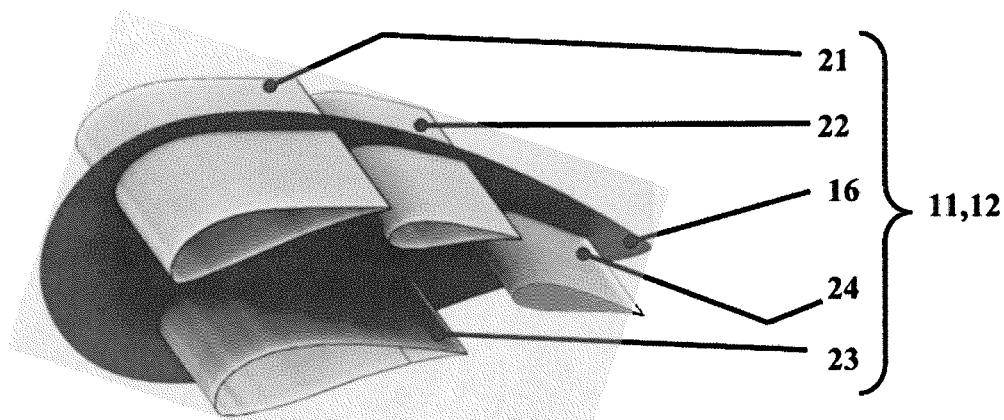
FIG. 9 shows a sectional view of one of the wings of the air device of FIG. 3.
Figure 10:
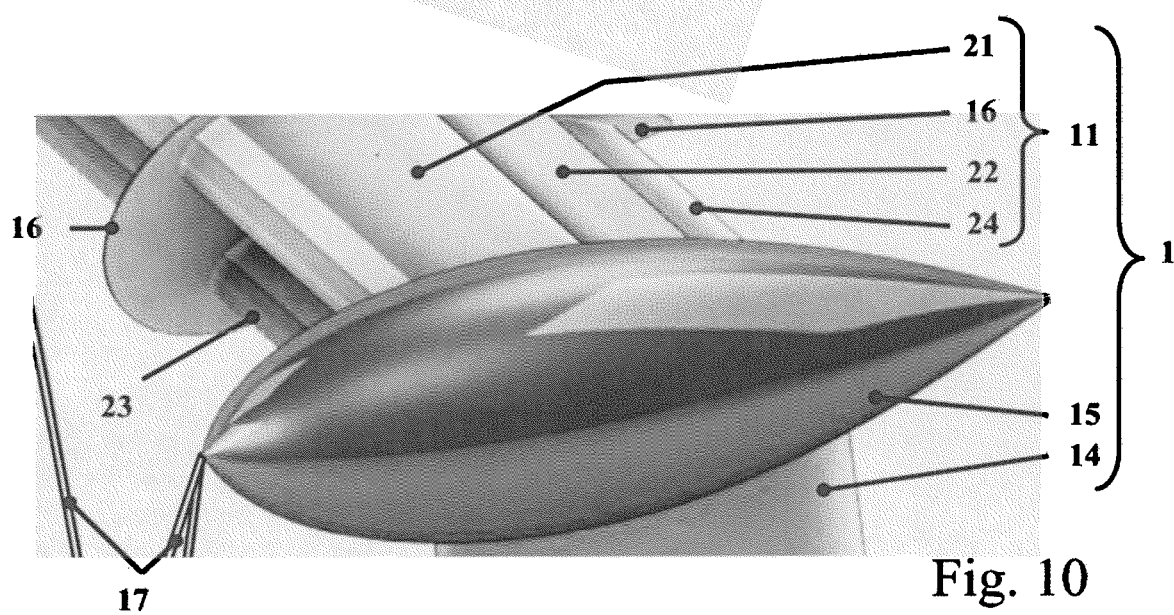
FIG. 10 shows a perspective view of one portion of the air device of FIG. 3.

The wings (11, 12) are made (FIG. 5, FIG. 6, FIG. 7, FIG. 8, FIG. 9, FIG. 10) according to a multiple element configuration including a set of distinct wing contours (21, 22, 23, 24). In practice the wing (11, 12) consists of a set of wing contours (21, 22, 23, 24) arranged in a condition of reciprocal proximity according to an arrangement such as to:

maximize aerodynamic efficiency obtaining small front overall dimensions;
minimize the overall weight of the wing (11, 12);
maximize the rigidity of the wing (11, 12).

With respect to a wing solution with one single contour as in the prior art, the wing with a multiple wing contours (21, 22, 23, 24) configuration has considerably reduced front overall dimensions. This implies a significant reduction of its drag with respect to the single contour wing.

The multiple wing contours (21, 22, 23, 24) comprise (FIG. 5, FIG. 6, FIG. 7, FIG. 8, FIG. 9) at least one first wing contour (21) and one second wing contour (22) which are reciprocally placed one after the other in a reciprocal parallelism condition and spaced from each other in such a way as to leave a first slot (38) between the trailing edge or tail end of the first wing contour (21) and the leading edge or head end of the second wing contour (22), the terms "head" and "tail" referring to the advancement direction (9). The presence of multiple wing contours (21, 22, 23, 24) allows to obtain an airflow on the wings (11, 12) which remains adherent to the wing surface. On the contrary, in the absence of multiple wing contours (21, 22, 23, 24), the airflow on the wings (11, 12), beyond a certain angle of incidence, detaches with respect to the wing surface causing a stall with a consequent loss of lift, traction and power. Preferably the multiple wing contours (21, 22, 23, 24) further include at least one third wing contour (23) which is placed below with respect to the first wing contour (21) and with respect to the direction of gravity when the air device (1) is in a flight position. The third wing contour (23) develops parallel with respect to the first wing contour (21) and is spaced from the first wing contour (21) by a greater distance with respect to the distance between the first wing contour (21) and the second wing contour (22) which are reciprocally placed one after the other. Preferably the multiple wing contours (21, 22, 23, 24) further include at least one fourth wing contour (24) which is placed according to a configuration in which the second wing contour (22) and the fourth wing contour (24) are reciprocally placed one after the other in a reciprocal parallelism condition and spaced from each other in such a way as to leave a second slot (39) between the trailing edge or tail end of the second wing contour (22) and the leading edge or head end of the fourth wing contour (24), the terms "head" and "tail" referring to the advancement direction (9). The set of multiple wing contours (21, 22, 23, 24) is placed according to an arrangement such that the envelope of the surfaces defined by the set of multiple wing contours (21, 22, 23, 24) has an essentially drop-like configuration so as to create an over-pressure on the underside of the wing (11, 12) and an under-pressure on the upside of the wing (11, 12), the terms "upside" and "underside" referring to the direction of gravity when the air device (1) is in a flight position. By over-pressure and under-pressure one means pressures which are different with respect to each other and with respect to the upside and underside of the wing (11, 12) in which the over-pressure indicates a greater pressure with respect to that indicated by the under-pressure. By the described configuration, the wings (11, 12) are characterised by a high lift coefficient CL and by a low drag coefficient CD, thus increasing the speed of the air device (1) when it is flying by effect of the wind and, most importantly, increasing aerodynamic efficiency. By increasing the number of wing contours of the set of multiple wing contours (21, 22, 23, 24) the lift coefficient CL of the wing (11, 12) increases.

The power generated by means of the air device (1) is proportional to the power to the power of three of the speed W of the air device (1) and to the square of the ratio between the lift coefficient CL and the drag coefficient CD according to the relation:

$$P \propto rAW^3 CL \left(\frac{CL}{CD}\right)^2 \quad \text{(i)}$$

In the relation (i) P indicates the power generated by means of the air device (1), CL indicates the lift coefficient of the wing (11, 12), CD indicates the drag coefficient of the wing (11, 12), W indicates the speed of the air device (1), A indicates the plan surface of the air device (1), r indicates air density.

Since by the described configuration the wings (11, 12) are characterised by a high lift coefficient CL, a low drag coefficient CD, high speed W, one obtains that the air device (1) according to the invention is able to generate a considerably greater power with respect to the prior art systems. It should be pointed out that for the described configuration, considering an exemplary angle of attack of the wing (11, 12) of five degrees, corresponding to the provided angle of flight, the air device (1) according to the invention has a value of the CL/CD ratio equal to or higher than 16.5, while a similar prior art device made in the form of a sail reaches at most values of the CL/CD ratio equal to 10. Therefore, the considerable advantage obtainable by the described configuration is evident.

The multiple wing contours (21, 22, 23, 24) are fixed to each other by means of a series of wing ribs (16) which are arranged spaced from each other along the longitudinal development of the wing contours (21, 22, 23, 24). The wing ribs (16) keep the wing contours (21, 22, 23, 24) together according to a reciprocally spaced configuration of one with respect to the others and distribute the load among the various wing contours (21, 22, 23, 24). Furthermore, the wing ribs (16) serve as a core of the spar in case of realization of a double "T" section in which the first wing contour (21) and the third wing contour (23) correspond to the bases of the spars.

The single wing contours (21, 22, 23, 24) are made by means of sections obtained by pultrusion, that is to say, by means of extrusion by pulling processes. The single wing contours (21, 22, 23, 24) can be made for example of carbon fibre or glass fibre or a combination of said materials treated by means of resin impregnation, for example polyurethane resin. Polyurethane resin has better characteristics as regards fatigue strength, weight and cost with respect to epoxy, vinyl ester, polyester resin. As an alternative, it is possible to resort to thermoplastic resins to increase even more fatigue strength and the mechanical characteristics in relation to weight. Internally the so obtained wing contours (21, 22, 23, 24) are hollow and can be subsequently filled with a core (25) of a material having a low specific weight, such as polystyrene. As an alternative, the wing contours (21, 22, 23, 24) can be made with a layered sandwich structure alternating materials having different weight and strength characteristics. In any case, by the described solutions, each of the wing contours (21, 22, 23, 24) constitutes a supporting beam of the structure of the wings (11, 12) which is light and at the same time very resistant. However, it will be evident that the single wing contours (21, 22, 23, 24) can be produced by any other production cycle of the known art.

The wings (11, 12), made up of set of multiple wing contours (21, 22, 23, 24) and series of wing ribs (16) form the load-bearing structure of the air device (1) according to the invention. In particular, to obtain the load-bearing function of the wings, it is important to have a structure with multiple wing contours (21, 22, 23, 24) and an upper contour, in our case the first wing contour (21), and a lower contour, in our case the third wing contour (23), in such a way as to produce the same effects as a much larger single wing contour with identical structural strength due to the fact that the structure with multiple wing contours (21, 22, 23, 24) has on its inside a spar with a double T section in which the upper contour and the lower contour act as bases of the spar and the ribs act as spacers and therefore as a core of the spar itself.

Therefore, the air device (1) according to the invention is made up of the wings (11, 12) and of the connection elements (13, 14) which as a whole form an essentially quadrangular structure. The connection elements (13, 14) have the purpose of reducing or possibly eliminating the end vortices by performing a function similar to that of the "winglets" present on the ends of the wings of some airplanes. Furthermore, the connection elements (13, 14) keep the first wing (11) and the second wing (12) at the correct distance (D) from each other. For example the connection elements (13, 14) can consist of pipes made of composite material, which are externally coated with a canvas cover to maintain an aerodynamic shape. The canvas can be made of a woven or non-woven material. In this way the connection elements (13, 14) have a light, elastic and at the same time resistant structure. The presence of the connection elements (13, 14) having an aerodynamic shape contributes to reducing or eliminating the end vortices of the wings (11, 12) which are formed because of the pressure difference present between the two opposite sides of each of the wings (11, 12). Such vortices increase the aerodynamic drag of the aircraft and, therefore, the aerodynamic shape of the connection elements (13, 14) also contributes to increasing the efficiency of the air device (1) according to the invention.

In correspondence of the connection zones between the connection elements (13, 14) and the wings (11, 12) cover elements (15) are further present, which are drop-shaped and which take the aerodynamic load from the connection elements (13, 14) and transfer it (FIG. 19) to a series of connection cables (40) which are then joined into one single retaining cable (18) which is connected to the trolley (8).

Preferably the series of connection cables (40) comprises at least one connection cable (40) for each angular end of the quadrangular structure. Each connection cable (40) can be joined to the corresponding wing in a recessed position with respect to the end of the wing, for example at a distance from the end of the wing which is equal to about one fourth with respect to the overall longitudinal development of the wing itself, in such a way as to optimize the structural part of the wing. The cover elements (15) can also accommodate on their inside control devices, command devices, sensors, remote communication tools and batteries.

Furthermore, the air device (1) can also be provided with stiffening cables (17) which form tension wires which are located inside the quadrangular structure of the air device and that contribute to further stiffening the structure of the latter. Each of the stiffening cables (17) is preferably coated with an aerodynamic cover.

Therefore, the air device (1) will have a good stiffness along the wing span due to the low wing aspect ratio and a fair torsional stiffness due to the closed structure provided with stiffening cables (17). The use of carbon fibre or glass fibre and polyurethane resin allows to have a high stress resistance and an excellent flexibility without the risk of breaking.

TABLE 1 illustrative characteristics of different models

|  | Model 1 of air device | Model 2 of air device | Model 3 of air device |
| --- | --- | --- | --- |
| Wing span (b) | 7.5 m | 15 m | 30.7 m |
| Wing chord (c) | 1.0 m | 2.0 m | 4.1 m |
| Wing aspect ratio (b/c) | 7.5 | 7.5 | 7.5 |
| Operating speed | 69 m/s | 69 m/s | 69 m/s |
| Characteristic area | 30 m² | 120 m² | 500 m² |
| Average length of the retaining cable | 384 m | 512 m | 1024 m |
| Average wing lift coefficient CL | 1.1 | 1.1 | 1.2 |
| Average wing drag coefficient CD | 0.076 | 0.074 | 0.072 |
| CL/CD ratio | 14.54 | 14.84 | 16.54 |

As one can see from the table, the air device (1) can be made in various models having different size characteristics. The average length of the retaining cable is related to the flight height of the air device (1). The operating flight height of the air device (1) essentially depends on the diameter of the annular guide (2) along which the trolleys (8) slide, which are towed by the air devices (1). If an air device (1) is placed at an excessive height with respect to the diameter of the annular guide (2) there is the risk of collision of different air devices (1) connected to different trolleys (8) on the same guide (2). Therefore, by increasing the diameter of the annular guide (2) one increases the cost of the plant but it is possible to use larger air devices (1) and greater flight heights with an improvement of the efficiency of the plant and with the exploitation of winds with greater speeds.

As to the structure on the ground (FIG. 1, FIG. 2, FIG. 12, FIG. 13, FIG. 17, FIG. 19, FIG. 21), it consists of a closed circuit, preferably but not necessarily having an annular shape, which comprises a guide (2) along which one or more trolleys (8) are slidingly engaged, each of which is towed, by means of the retaining cable (18), by a corresponding air device (1) placed at altitude. Therefore, on the guide (2) there can be several trolleys which travel on the guide (2) in an equidistant way with respect to each other, each towed by a respective air device (1).

For example one can have plants with annular structures on the ground having different diameters. Considering the examples previously shown in table 1, one can have, as an example only, the following situations for corresponding annular structures on the ground.

TABLE 2 illustrative characteristic of plants

|  | Model 1 of air device | Model 2 of air device | Model 3 of air device |
| --- | --- | --- | --- |
| Wing span (b) | 7.5 m | 15 m | 30.7 m |
| Average length of the retaining cable | 384 m | 512 m | 1024 m |
| Diameter of the annular structure of the plant | 400 m | 700 m | 1400 m |
| Annular circumference of the plant | 1256 m | 2198 m | 4396 m |
| Quantity of generation trolleys | 6 | 8 | 12 |
| Average power generated by the plant | 0.5 GWh/year | 4.1 GWh/year | 98 GWh/year |

The guide (2) is supported in a raised position with respect to the ground by means of a series of towers (6), preferably placed in a reciprocally equidistant position along the longitudinal development of the guide (2). The structure consisting of the guide (2) and towers (6) is anchored to the ground by a system of fixing ropes (7) which system provides a high resistance to side loads.

Figure 15:
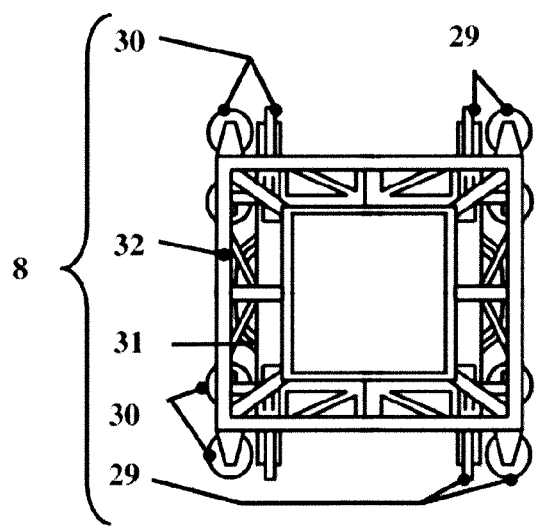
FIG. 15 shows a plan view of the trolley of FIG. 14.
Figure 16:
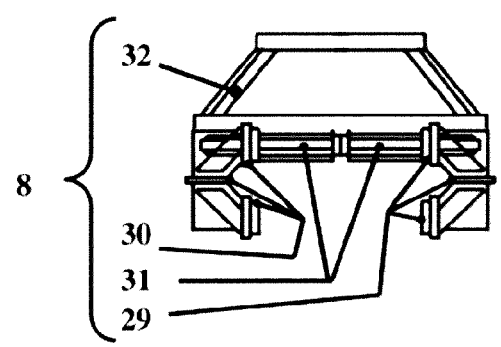
FIG. 16 shows a front view of the trolley of FIG. 14.
Figure 18:
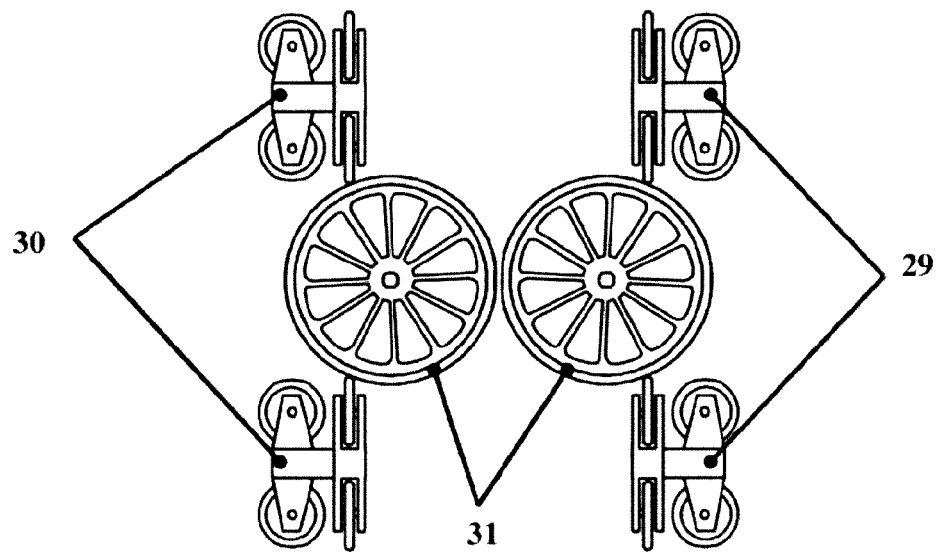
FIG. 18 shows a view of the system of wheels of the trolley of FIG. 14.

The guide (2) comprises (FIG. 12, FIG. 13, FIG. 17) a first rail (3) and a second rail (4) which are parallel to each other and spaced from each other and which are preferably made in the form of tubular rails. The first rail (3) and the second rail (4) act as guiding means for keeping the trolley (8) in position. Furthermore, the guide (2) also comprises a track (5) which is preferably placed between the first rail (3) and the second rail (4). The central track (5) is used to release the traction forces of the air device (1) and activate (FIG. 14, FIG. 15, FIG. 16, FIG. 18) transmission wheels (31) of the trolley (8) which are opposed rubber wheels which are in contact on opposite sides of the central track (5).

The trolley (8) is provided with a frame (32) to which are fixed:
  a first group of retaining wheels (29) which are slidingly engaged on the first rail (3);
  a second group of retaining wheels (30) which are slidingly engaged on the second rail (4);
  a pair of opposed transmission wheels (31) which are in contact on opposite sides of the central track (5).

Each group of retaining wheels (29, 30) can comprise a set of front wheels and a set of rear wheels, in which the terms "front" and "rear" refer (FIG. 13) to the advancement direction (9) of the trolley (8) on the guide (2). Each set of wheels can consist of three pairs of wheels which are slidingly engaged on the respective rail (3, 4) according to different engagement directions, for example according to engagement directions at ninety degrees with respect to each other. The groups of retaining wheels (29, 30) are used to keep the trolley in position with respect to the respective rail (3, 4).

On each trolley (8) a winch (26) is installed to unwind and wind the retaining cable (18) of the air device (1) during the take-off and landing phases. The winch (26) comprises a motor connected to a bobbin for winding the retaining cable (18). The winch further comprises a control system and a supply system connected to the mains and provided with an emergency battery for managing the phases of winding of the retaining cable (18) in case of absence of power from the mains.

The trolley is also provided with at least one motor-generator, if necessary two motors-generators (27, 28). The motor-generator or the motors-generators (27, 28) transform the kinetic energy of the trolley (8) into electric power. For example, for a solution with two motors-generators (27, 28), a first motor-generator (27) is connected to a first one of the transmission wheels (31) and a second motor-generator (28) is connected to a second one of the transmission wheels (31) which are two rubber disc wheels counter-rotating in contrast on the central track (5) of the guide (2) in such a way as to discharge the whole load without the risk of skidding.

The air device (1) flies at a high speed parallel to the ground moving alternately rightwards and leftwards with respect to the guide (2) following (FIG. 21) an essentially "8" shaped trajectory (35).

Each air device (1) can be controlled by means of a control system comprising one or more among position sensors, acceleration sensors, GPS positioning sensors, control sensors of the direction of the retaining cable (18), radar position sensors. In this way the position of each air device (1) present on the guide (2) is certain and the risk of collision both between the air devices (1) themselves and between the air devices (1) and external airplanes is eliminated or significantly reduced.

The air device (1) is controlled by means of controls placed on the air device (1) itself in order to make it follow (FIG. 21) an "8" shaped trajectory (35), according to what is stated in the following of the present description.

For the purpose of reducing its aerodynamic drag, a coating (41) of shaped rubber foam is hooked around the retaining cable (18) to decrease aerodynamic drag.

At regular intervals along the coating (41) it is provided to insert a piezoelectric generator which is charged with the vibrations generated by the air device (1) during flight. The piezoelectric generator will supply a series of light devices, preferably with LEDs, which allow to identify the retaining cable (18) at night-time. The coating (41) will preferably be further provided with reflective parts in order to increase visibility also during the daytime. Also the fact that the coating (41) has a greater size with respect to the retaining cable (18) contributes to increasing its visibility during the daytime.

The retaining cable (18) has a less resistant point in correspondence of the connection zone with the air device (1) in such a way as to create a preferred breaking point of the retaining cable (18). Since the breaking point is positioned in correspondence of the connection zone with the air device (1), in case of breaking, the retaining cable (18) can be quickly rewound by the winch (26) without risking to cause damage due to the fall of the cable itself should it reach the ground far from the plant (10) while it is dragged by the air device (1) in an emergency manoeuvre.

The air device (1) has various mini-actuators placed on the ends (36, 37) of the wings (11,12), which control (FIG. 23, FIG. 24, FIG. 25) some spoilers (43) placed on the ends (36, 37) of the wings (11, 12).

The spoilers can be placed (FIG. 23) between the slots (38, 39) present between the various wing contours (21, 22, 23, 24). If the slot (38, 39) is obstructed, the airflow stops and the whole airflow on the part of the suction surface of the wing (11, 12) will lose energy in such a way as to stall the air device (1).

Alternately or in combination the spoilers (43) can be placed (FIG. 24, FIG. 25) on the upside of the first wing contour (21), that is to say, on the upside of the wing contour which is in a higher position with respect to the set of the multiple wing contours (21, 22, 23, 24). In this way the spoiler, when lifted in an operating position, also removes the flow from the contour itself as well as from the following ones in the sequence of the multiple wing contours (21, 22, 23, 24), so to maximise the lift drop and maximise flight control and control reactivity.

The spoilers (43) can be of the hinged type (FIG. 23, FIG. 24) or can be (FIG. 25) of the recessed type linearly extractable from a gap obtained in the wing contours (21, 22, 23, 24), for example in the first wing contour (21).

If the spoiler of a first end (36) is actuated, said first end (36) of the wings (11, 12) will produce a greater resistance with respect to the second end (37) of the wings (11, 12) and will slow down said first end (36) with respect to the second end (37) allowing for the control of the changes of direction of the air device (1). In order to slow down the air device (1) one can operate the actuators of the spoilers of both ends (36, 37). In order to supply energy to the actuators and to the control system on the air device (1), it can be provided with special anti-vibration flexible photovoltaic panels or energy generation systems which exploit vibrations such as piezoelectric generation systems or small wind generators with propellers. One can provide solutions in which there are only photovoltaic panels or only systems for generation of energy from vibrations or only small wind generators with propellers or a combination thereof. In any case it is provided to use a rechargeable battery to accumulate the necessary power for managing in an optimal way the control of the air device (1).

In general, therefore, the air device (1) can comprise at least one pair of spoilers (43) movable by means of actuators, the spoilers being placed (FIG. 23) near the at least one slot (38, 39) between the wing contours (21, 22, 23, 24), each of the spoilers (43) being movable between at least two positions of which:
- a first position is an extended position in which the spoiler (43) obstructs at least partially the slot (38, 39);
- a second position is a retracted position in which the spoiler (43) is in a condition of essential non-obstruction of the slot (38, 39).

As an alternative, one can provide a solution (FIG. 24, FIG. 25) in which the air device (1) can comprise at least one pair of spoilers (43) movable by means of actuators, the spoilers (43) being placed on the upper side of at least one of the wing contours (21, 22, 23, 24), each of the spoilers (43) being movable between at least two positions of which:

a first position is an extended position in which the spoiler (43) constitutes an obstacle to the airflow on the upper side of the wing contour on which it is mounted;

a second position is a retracted position in which the spoiler (43) is in a condition of essential adhesion with respect to the wing contour on which it is mounted or in a recessed condition within the section of the wing contour on which it is mounted.

The take-off of the air device (1) occurs if a detection system of the high-altitude wind, such as a system called "Sodar", confirms that at a high altitude there is sufficient wind for power production and if the weather forecast indicates weather stability.

The various phases of the take-off of each single air device (1) can be summarized as follows:

the trolley (8) moves on the guide (2) until it gets in correspondence (FIG. 20) of a crane provided with a rotating base (34) which supports a telescopic arm (33);

an air device (1) is hooked to the telescopic arm (33) of the crane.

As an alternative, it is also possible that each trolley (8) is provided with a respective crane to speed up the start and stop operations of the plant;

the retaining cable (18) of the air device (1) is connected to the trolley (8);

the air device (1) is lifted up to a certain height, for example to 30 m of height, by means of the telescopic arm (33) of the crane to which it is connected, so as to minimize the influence of the ground turbulence and find a wind with greater intensity;

the telescopic arm (33) places the air device (1) upwind and then frees it at the initial positioning height;

if the wind at the initial positioning height of the air device (1) is insufficient, the system sets in motion the trolley (8) on the ground by means of the motors-generators (27, 28) and the trolley (8) tows the air device (1) while the winch (26) unwinds the retaining cable (18) in such a way as to allow the air device (1) to gain height and find an altitude at which there is sufficient wind for the self-sustainment of motion;

at this point the take-off procedure is repeated with a following trolley (8) and a corresponding air device (1) until completing the take-off phases of all the air devices (1) provided in the plant (10).

One can install several cranes for the purpose of speeding up the take-off procedure of all the air devices (1) provided in the plant (10). However, the cranes must be placed at a suitable distance from each other because it is essential that there are suitable safety distances between the taking off air devices (1). In fact, close to the ground the wind direction can also vary by 90° in various—even close—points due to gusts and turbulences.

Should there no longer be the suitable conditions for the flight of the air device (1), for example due to too strong or too weak wind, the return procedure consists of the following phases:

the air device (1) moves to the lateral part of its envelope arc of flight where there is not much aerodynamic load and therefore minimum power;

the retaining cable (18) is rewound by the winch (26) on its respective bobbin;

when the retaining cable (18) is almost completely rewound, the trolley (8) of the respective air device (1) during landing positions itself next (FIG. 20) to the crane and to the respective arm (33);

the crane hooks the retaining cable (18) and then, afterwards, hooks further retaining points of the air device (1) so as to be able to move it rigidly;

the air device (1) is thus taken to the ground in an overturned position and released from the retaining cable (18);

at this point the return procedure is repeated with a following air device (1) until completing the return phases of all the air devices (1) flying in the plant (10).

The take-off and return phases may also include further movement phases of the crane for the housing and the extraction of the air devices (1) into and from a depot of the latter in which the air devices (1) are guarded in a protected position.

The air device (1) can be further provided with a safety system for overspeed protection. The system is based on a both passive and active aerodynamic system. In the case in which power is no longer available on the air device (1) the previously described spoilers open automatically and slow the air device (1). The air device (1) can thus be retracted without effort by the winch (26).

The plant (10) and the air device (1) are not affected by phenomena of direct lightning discharges since the retaining cable (18) which connects the air device (1) to the ground consists of electrically insulating material and the air device (1) does not behave as an antenna. This is an advantageous consequence of the fact that power generation does not occur at a high altitude, as in the case of some prior art systems, but power generation occurs on the ground on the trolley (8).

Wind intermittence is one of the important factors to take into account: at 400 m of altitude the wind is almost always present, but if it is not in the usable speed range, the air devices (1) are made to land one by one using the crane. As an alternative, each trolley (8) can also be provided with a respective crane for speeding up the start and stop operations of the plant which can thus take place simultaneously for all the air devices (1).

In case of sudden absence of wind, the trolley (8) on the guide (2) positions itself in the towing mode in which the motors-generators (27, 28) act as motors and tow the air device (1) in such a way as to keep it flying for the time necessary for the return of wind or for the return of the air device (1) to the ground.

During start-up, the plant (10) is configured and structured for starting automatically by placing the air devices (1) upwind and lifting them to altitude in a short time.

During stopping, the plant (10) is configured and structured to recover the air devices (1) one at a time using the arm (33) of one or more cranes.

The minimum wind conditions for starting up the plant (10) must provide a stay of the air devices (1) at altitude for a period as long as possible, with a minimum duration to be ensured, since in the start-up and stopping phases there is power consumption for the movement of the trolleys (8) and of the cranes. It should be noted that, with the exclusion of the programmed maintenance phases, the recovery of the air devices (1) generally occurs only when there are problematic wind conditions, while in the presence of suitable wind conditions the air devices (1) can remain at altitude for prolonged activity periods as well.

In conclusion, the present invention relates to (FIG. 3, FIG. 4, FIG. 5, FIG. 6, FIG. 7, FIG. 8, FIG. 9, FIG. 10) an air device (1) for (FIG. 1, FIG. 19, FIG. 21) a wind power generation plant (10) in which the air device (1) comprises at least one wing (11, 12) which is made according to a multiple element configuration including a set of distinct wing contours (21, 22, 23, 24) arranged in a condition of reciprocal proximity, said set of wing contours (21, 22, 23, 24) comprising at least one first wing contour (21) and a second wing contour (22) which are reciprocally placed one after the other in a reciprocal parallelism condition and spaced from each other in such a way as to leave at least one slot (38, 39) between a trailing edge or tail end of the first wing contour (21) and a leading edge or head end of the second wing contour (22), the terms "head" and "tail" referring to an advancement direction (9) of the air device (1).

Furthermore, the present invention relates to (FIG. 1, FIG. 2, FIG. 12, FIG. 13, FIG. 14, FIG. 19, FIG. 21) a wind power generation plant (10) of the type in which:

- at least one trolley (8) or towed means is movable along a guide (2) by means of a traction air device subject to the wind power which generates a traction kinetic energy on the trolley (8);
- the at least one trolley (8) or towed means is provided with electric power generation means by transformation of the traction kinetic energy of the traction air device;

and furthermore in which the traction air device is an air device (1) made according to one of the previously described solutions.

The trolley (8) or towed means can also be made in the form of a vehicle in which case the guide (2) should be intended as a road on which the vehicle moves, optionally comprising reception means of the produced power placed on the road itself, which are combined with transmission means of the produced power produced on the vehicle towed by the air device (1).

Furthermore, the present invention also relates to (FIG. 26) a ship (42) provided with a traction air means which exerts a traction force in the advancement direction of the ship (42) and in which the traction air means is an air device (1) according to one of the previously described solutions.

The description of the present invention has been made with reference to the enclosed figures in a preferred embodiment, but it is evident that many possible changes, modifications and variations will be immediately clear to those skilled in the art in the light of the previous description. Thus, it must be underlined that the invention is not limited to the previous description, but it includes all the changes, modifications and variations in accordance with the appended claims.

NOMENCLATURE USED

With reference to the identification numbers in the enclosed figures, the following nomenclature has been used:
1. Traction air device
2. Guide
3. First rail
4. Second rail
5. Track
6. Tower
7. Fixing rope
8. Trolley
9. Advancement direction
10. Power generation plant
11. First wing
12. Second wing
13. First connection element
14. Second connection element
15. Cover element
16. Wing rib
17. Stiffening cable
18. Retaining cable
19. First wing plane
20. Second wing plane
21. First wing contour
22. Second wing contour
23. Third wing contour
24. Fourth wing contour
25. Core
26. Winch
27. First motor-generator
28. Second motor-generator
29. First group of retaining wheels
30. Second group of retaining wheels
31. Transmission wheel
32. Frame
33. Arm
34. Base
35. Trajectory
36. First end
37. Second end
38. First slot
39. Second slot
40. Connection cable
41. Coating
42. Ship
43. Spoiler
a'. First angle
a". Second angle
D. Distance

The invention claimed is:

1. A traction air device wherein the air device comprises at least one wing which is made according to a multiple element configuration including a set of wing contours constituting multiple wing contours which are placed in a reciprocal proximity condition, said set of wing contours comprising at least one first wing contour and one second wing contour which are reciprocally placed one after the other in a reciprocal parallelism condition and spaced from each other in such a way as to leave at least one slot between a trailing edge or tail end of the first wing contour and a leading edge or head end of the second wing contour, the head end and tail end defining an advancement direction of said traction air device, the traction air device comprising at least two of said wings which are placed according to a reciprocally superimposed configuration in which a first wing is connected to a second wing by way of connection elements which keep the two wings spaced from each other, characterised in that said first wing is vertically misaligned with respect to said second wing, the connection elements having a resistant structure and being connected to the wings according to a configuration such that a longitudinal development axis of the connection elements is angled with respect to wing planes of the wings and the multiple wing contours being fixed to each other by way of a series of wing ribs which are arranged spaced from each other along the longitudinal development of the wing contours, the wing ribs keeping the wing contours together according to a reciprocally spaced configuration of one with respect to the others so that the load among the various wing contours is distributed, the wing ribs constituting a core of a spar structure with a double "T" section configuration in which the first wing contour and the third wing contour correspond to the bases of the spars and are reciprocally connected by the wing ribs.

2. The traction air device according to claim 1, characterised in that said set of wing contours further comprises at least one third wing contour which is placed below with respect to the first wing contour and with respect to the direction of gravity when the air device is in a flight position, said third wing contour developing in a parallel way with respect to the first wing contour.

3. The traction air device according to claim 2, characterised in that said third wing contour is spaced from the first wing contour by a greater distance with respect to the distance between the first wing contour and the second wing contour which are reciprocally placed one after the other.

4. The traction air device according to claim 1, characterised in that said set of wing contours comprises:
  said first wing contour and said second wing contour which are reciprocally placed one after the other in a reciprocal parallelism condition and spaced from each other in such a way as to leave at least one first slot between the trailing edge or tail end of the first wing contour and the leading edge or head end of the second wing contour;
  an additional fourth wing contour which is placed according to a configuration in which the second wing contour and the fourth wing contour are reciprocally placed one after the other in a reciprocal parallelism condition and spaced from each other in such a way as to leave a second slot between the trailing edge or tail end of the second wing contour and the leading edge or head end of the fourth wing contour.

5. The traction air device according to claim 1, characterised in that said set of wing contours is placed according to an arrangement such that the envelope of the surfaces defined by the set of multiple wing contours has an essentially drop-like configuration so as to create an over-pressure on the underside of the wing and an under-pressure on the upside of the wing, the terms "upside" and "underside" referring to the direction of gravity when the traction air device in a flight position.

6. The traction air device according to claim 1, characterised in that said connection elements keep the two wings spaced from each other by a distance (D), said distance (D) being equal to a value such that the ratio between the width of the traction air device and the distance (D) between the two wings is between 0.8 and 1.2.

7. The traction air device according to claim 1, characterised in that said connection elements comprise a first connection element which connects the first wing to the second wing near a first end of the longitudinal development of the wings and a second connection element which connects the first wing to the second wing near a second end of the longitudinal development of the wings, wherein the first end and the second end are opposite ends of the longitudinal development of the wings, the connection elements being connected to the wings according to a configuration such that the first wing, the second wing, the first connection element and the second connection element form an essentially quadrangular structure with double superimposed wings.

8. The traction air device according to claim 1, characterised in that said first wing is vertically misaligned with respect to said second wing according to a configuration such that the first wing is placed forward with respect to the second wing and with respect to the advancement direction, the connection elements being connected to the wings according to a configuration such that said longitudinal development axis of the connection elements forms a first angle with respect to wing planes of the wings.

9. The traction air device according to claim 8, characterised in that said first angle is greater than ninety degrees, preferably between 91 and 135 degrees, even more preferably between 95 and 130 degrees.

10. The traction air device according to claim 1, characterised in that said first wing is vertically misaligned with respect to said second wing according to a configuration such that the first wing is placed rearward with respect to the second wing and with respect to the advancement direction, the connection elements being connected to the wings according to a configuration such that the longitudinal development axis of the connection elements forms a second angle with respect to wing planes of the wings.

11. The traction air device according to claim 1, characterised in that said second angle is less than ninety degrees, preferably between 45 and 89 degrees, even more preferably between 50 and 85 degrees.

12. The traction air device according to claim 1, characterised in that said connection elements are made by way of pipes which are externally coated with a canvas cover according to an aerodynamic shape.

13. The traction air device according to claim 1, characterised in that in correspondence of the connection zones between the connection elements and the wings cover elements are further present, which are drop-shaped.

14. The traction air device according to claim 7, characterised in that it comprises stiffening cables which form tension wires which are located inside the quadrangular structure of the traction air device.

15. The traction air device according to claim 1, characterised in that it comprises at least one pair of spoilers which are movable by way of actuators, said spoilers being placed near said at least one slot between said wing contours, each of said spoilers being movable between at least two positions of which:
  a first position is an extended position in which the spoiler obstructs at least partially said slot;
  a second position is a retracted position in which the spoiler is in a condition of essential non-obstruction of said slot.

16. The traction air device according to claim 1, characterised in that it comprises at least one pair of spoilers which are movable by way of actuators, said spoilers being placed on the upper side of at least one of the wing contours, each of the spoilers being movable between at least two positions of which:
  a first position is an extended position in which the spoiler constitutes an obstacle to the airflow on the upper side of the wing contour on which it is mounted;
  a second position is a retracted position in which the spoiler is in a condition of essential adhesion with respect to the wing contour on which it is mounted or in a recessed condition within the section of the wing contour on which it is mounted.

17. The traction air device according to claim 1, characterised in that it comprises an on-board power generation system selected from photovoltaic panels, power generation systems which exploit vibrations, wind power generation systems with airscrews or a combination thereof, said on-board power generation system generating power for the supply of light emitting signaling devices, position sensors, acceleration sensors, GPS positioning sensors, radar sensors, transmission systems, flight control systems.

18. A wind power generation plant, comprising:
  at least one trolley movable along a guide by way of a traction air device subject to wind power which generates a traction kinetic energy on the trolley by way of a retaining cable;

wherein said at least one trolley comprises a generator configured to transform the traction kinetic energy of said traction air device into electrical power;
characterised in that said traction air device is a traction air device according to claim 1.

19. The wind power generation plant according to claim 18, characterised in that the guide comprises:
a first rail and a second rail which are reciprocally parallel and spaced rails configured to guide the trolley, the trolley being slidingly engaged on the rails by way of groups of retaining wheels of the trolley;
a track which constitutes a coupling interface for at least one transmission wheel of the trolley which is connected to at least one corresponding electric power generator.

20. A ship provided with a traction air device which exerts a traction force in the advancement direction of the ship, characterised in that said traction air device is a traction air device according to claim 1.

* * * * *